United States Patent
Kaufman et al.

(10) Patent No.: US 12,535,963 B2
(45) Date of Patent: Jan. 27, 2026

(54) METHOD AND SYSTEM FOR SUPPORTING DEDUPE, COMPRESSION, LOGICAL VOLUME CRYPTO-ERASURE, AND PHYSICAL VOLUME CRYPTO-ERASURE ON A STORAGE ARRAY

(71) Applicant: Dell Products L.P., Round Rock, TX (US)

(72) Inventors: Charles William Kaufman, Redmond, WA (US); Naizhong Chiu, Newton, MA (US); Jamie Pocas, Milford, MA (US); Saoni Mukherjee, Westborough, MA (US); Radia Joy Perlman, Redmond, WA (US); James McCoy, Holliston, MA (US); Ashok Tamilarasan, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 412 days.

(21) Appl. No.: 18/308,035

(22) Filed: Apr. 27, 2023

(65) Prior Publication Data
US 2024/0361936 A1 Oct. 31, 2024

(51) Int. Cl.
*G06F 3/06* (2006.01)
(52) U.S. Cl.
CPC .......... *G06F 3/0641* (2013.01); *G06F 3/0623* (2013.01); *G06F 3/0665* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 8,117,464 B1* | 2/2012 | Kogelnik | H04L 67/1097 |
| | | | 713/180 |
| 10,402,571 B2* | 9/2019 | Nayshtut | G06F 11/1453 |
| 2017/0123710 A1* | 5/2017 | Fisher | G06F 3/0644 |
| 2021/0173945 A1* | 6/2021 | Karr | G06F 3/065 |
| 2022/0179974 A1* | 6/2022 | Hetzler | H04L 9/0894 |

* cited by examiner

*Primary Examiner* — Michael Alsip
(74) *Attorney, Agent, or Firm* — Chamberlain, Hrdlicka, White, Williams & Aughtry

(57) ABSTRACT

A method for operating a storage array includes: generating a per-chunk key and a deduplication key for a data chunk based on a hash value, wherein the per-chunk key is stored in a metadata file; obtaining a per-volume key for a volume of the storage array; encrypting a metadata folder associated with the volume to generate an encrypted metadata folder using the per-volume key, in which the encrypted metadata folder comprises at least the metadata file; compressing the data chunk to generate a compressed data chunk (CDC); encrypting the CDC to generate an encrypted compressed data chunk (ECDC) using the per-chunk key, in which the ECDC is stored in the volume; obtaining storage location information of the ECDC; updating a hash value lookup table based on the storage location information; and initiating notification of a user of a client about completion of a write request.

13 Claims, 8 Drawing Sheets

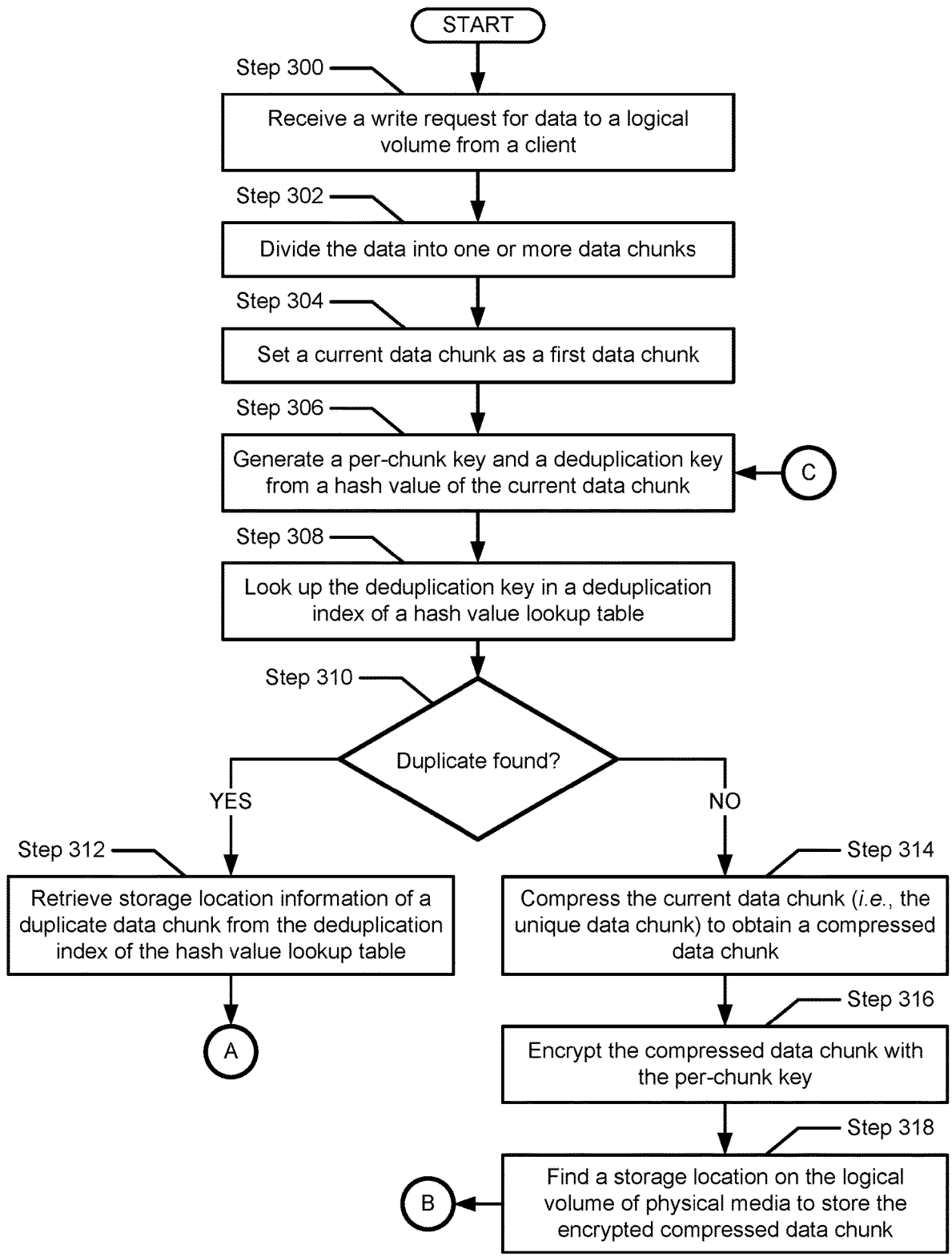
FIG. 3.1

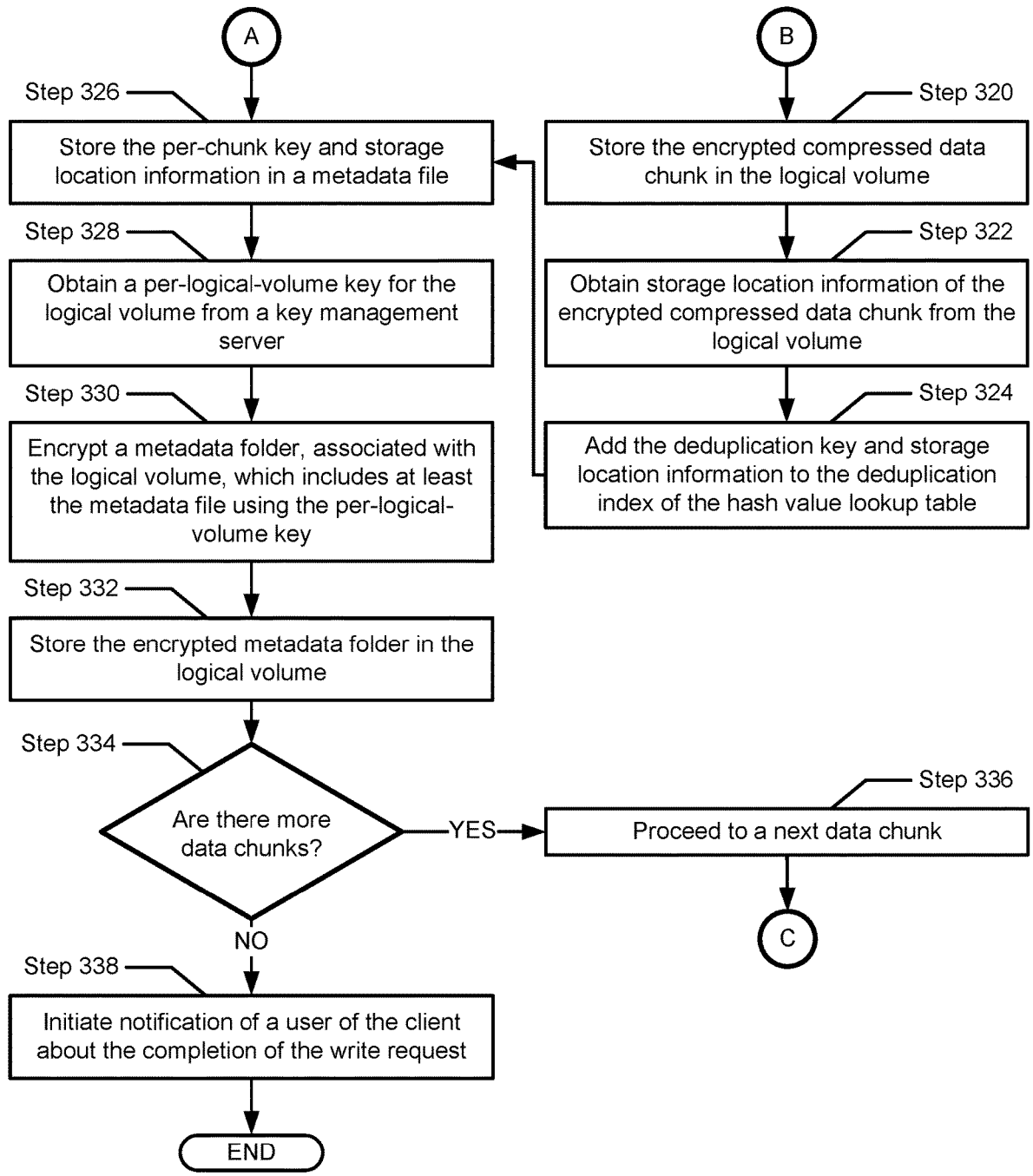
FIG. 3.2

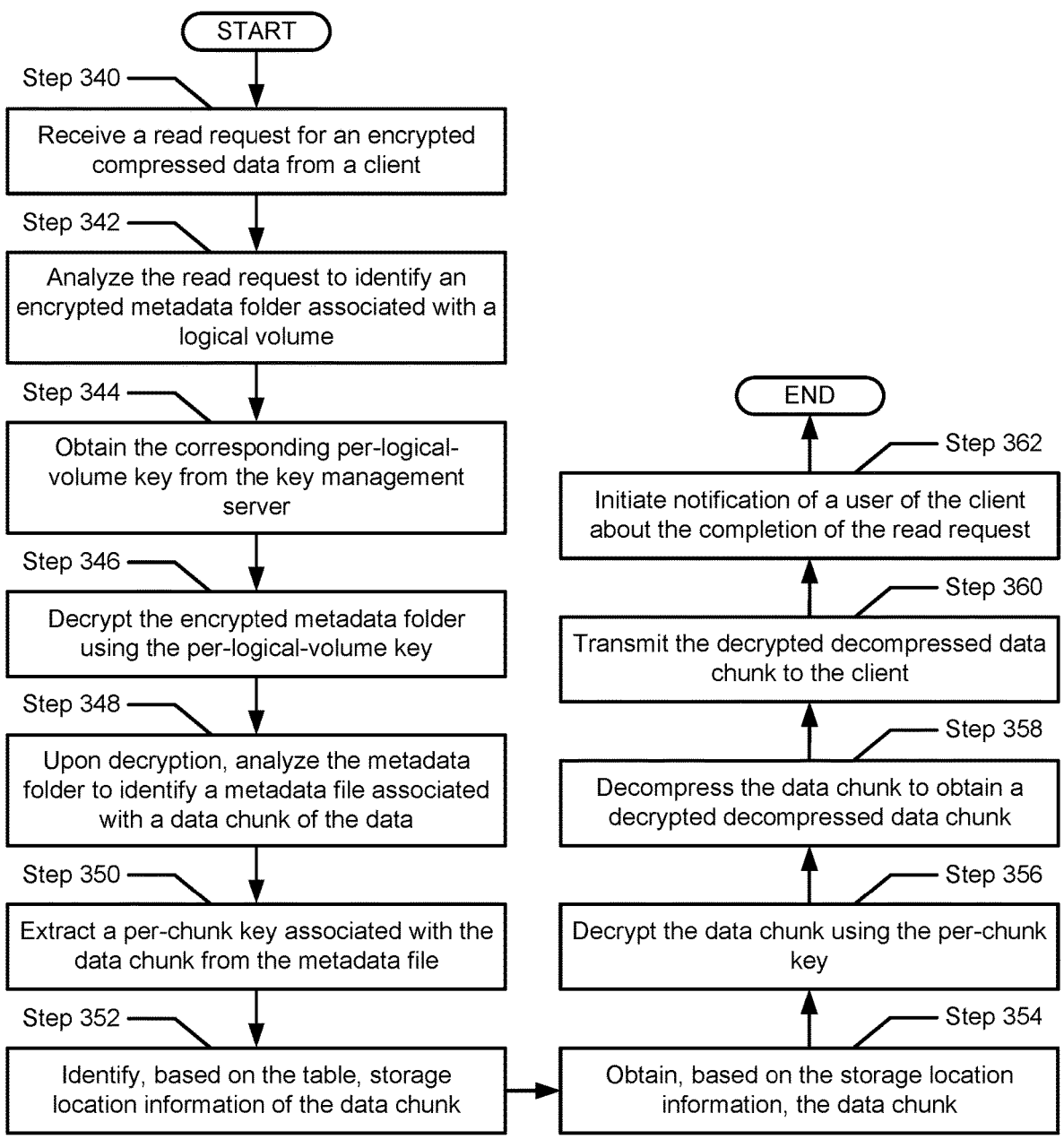
FIG. 3.3

METHOD AND SYSTEM FOR SUPPORTING DEDUPE, COMPRESSION, LOGICAL VOLUME CRYPTO-ERASURE, AND PHYSICAL VOLUME CRYPTO-ERASURE ON A STORAGE ARRAY

BACKGROUND

Computing devices may include any number of internal components such as processors, memory, and persistent storage. Data sent between computing devices may be subject to undesired exposure to additional computing devices. Computing devices may implement security measures in an attempt to reduce the undesired exposure.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIGS. 3.1-3.3 show a method for supporting dedupe, compression, logical volume crypto-erasure, and physical volume crypto-erasure on a storage array in accordance with one or more embodiments of the invention.

DETAILED DESCRIPTION

Figure 1:
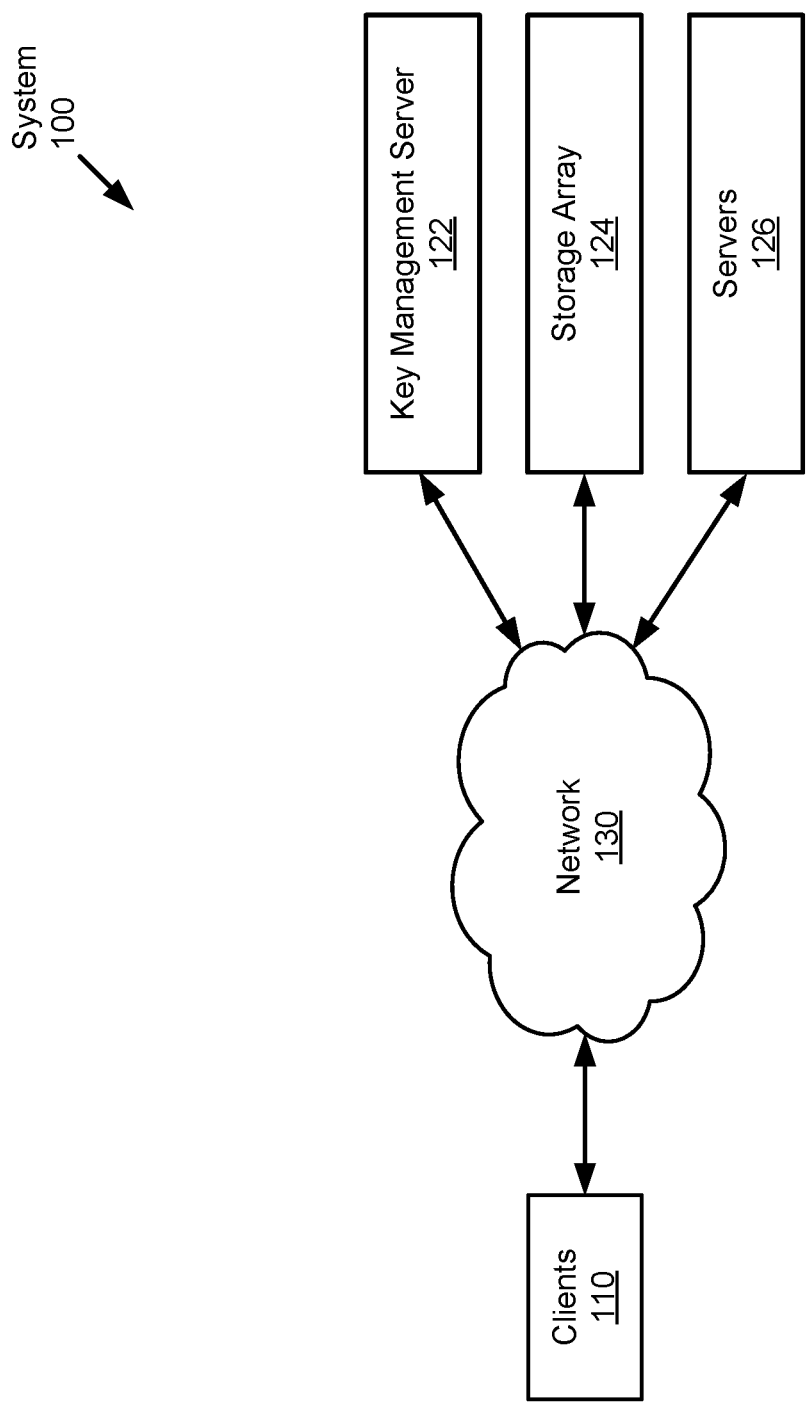
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, sensitive (e.g., important, confidential, secret, etc.) information (e.g., plaintext), such as business-critical information, implementation details, and/or information subject to government regulations (e.g., protected health information (PHI), personal identifiable information (PII), credit card numbers, social security numbers, etc.), which resides on a storage system (e.g., a data domain, a storage array, etc.) may be compromised by an attacker (e.g., a hacker, a malicious user, an intruder, etc.) having physical access to the storage system, or by an attacker exploiting a security flaw in the storage system. It may be difficult to ensure that there are no exploitable flaws in a larger and distributed storage system because the storage system may include hundreds of thousands, or even millions of assets (e.g., folders, files, etc.) and lines of code. Even if the storage system itself is not flawed, data on the storage system may still need to be protected against someone who breaks into or who obtains physical access to the storage system upon which the data is stored. For example, an intruder may steal a hard disk drive (HDD) and attach it to another computing device to obtain access to assets. In order to protect (e.g., secure) sensitive data from unauthorized access, organizations (or enterprises) (i) may store sensitive data in an encrypted form (e.g., encrypting data at a file system level) and (ii) may encrypt sensitive data prior to transfer over a public network (e.g., a non-secure network). In this manner, when the encrypted data needs to be accessed, the encrypted data may first be decrypted using a key.

In most cases, when sensitive data is deleted (because, for example, the data is no longer needed and the data needs to remain secret) from a storage system (e.g., a storage area network (SAN) infrastructure), it may be possible that storage (e.g., physical storage space) of the storage system is not actually overwritten (for example, until the space is needed) but rather the storage space is marked as available for reuse. This may prevent the data from being retrievable via conventional data retrieval mechanisms; however, with newer storage technologies (e.g., solid-state storage technology), the data may still be forensically recoverable. For example, in some cases, even if parts of a solid-state disk (SSD) are overwritten, previously stored data may be forensically recoverable (from the SSD) by a user (e.g., an intruder) who uses advanced software and/or advanced hardware to examine the SSD (because SSDs may have overflow space for worn-out parts).

Further, a storage array (e.g., a SAN infrastructure, a network-attached storage (NAS) infrastructure, etc., which includes one or more physical or logical drives) may emulate a large number of logical volumes on a collection of physical devices (e.g., drives) and may implement redundant array of independent disk (RAID) technology to transparently recover from hardware failures. If, for example, a physical drive fails, contents (e.g., sensitive data) of the physical drive may be reconstructed on a spare physical drive and the failed physical drive may be discarded. After discarding the failed physical drive, to maintain the confidentiality of the contents of the failed physical drive, it may be important that someone who recovers the failed physical drive not be able to repair it and read sensitive data from it. Usually, this is accomplished by encrypting all data (of the physical drive) with a per-physical-drive key (e.g., a per-physical-volume key) and discarding the per-physical-drive key (for example, via a key management server (described below) or a lockbox (described below) that has a functionality to keep and/or reliably forget cryptographic keys for physical or logical drives, as opposed to HDDs and/or SSDs) if the physical drive is discarded, in which this process is called crypto-erasure (which is different from overwriting data with some other value to delete that data) and this process may be performed even when the physical drive is inoperable.

Similarly, based on at least the above reasons, when a logical drive is deleted (or discarded), (i) all data (of the logical drive) may be encrypted with a per-logical-drive key (e.g., a per-logical-volume key, a context-specific key, etc.) and (ii) the per-logical-drive key may be discarded (for example, via the key management server). This process may still be effective even if data stored on the logical drive is only marked as free and not actually erased because any data that remains behind in freed space may not be recovered without the per-logical-drive key.

However, there are still many concerns with the encrypted storage of data in a storage array (more particularly, in a logical volume), such as preventing other logical volumes from having access to the unencrypted data and/or the per-logical-volume key(s) used to encrypt that data. Further, conventional encryption methods may generate different encrypted data from the same unencrypted data (e.g., those encryption methods may generate different ciphertext from the same plaintext) due to best practices calling for the use of different initialization vectors for each encryption operation, as well as in situations in which different volumes encrypt the same data with different encryption keys. These best practices for encryption make it impossible, without design changes, for a storage array (i) to perform data deduplication operations that are often used to eliminate duplicate data storage on the volumes and (ii) to provide more efficient use of storage in the storage array.

For example, even if data (of a logical volume) is encrypted with a per-logical-volume key, it may be hard to preserve storage space (of the storage array) by saving only a single copy of the data (which may be available on other logical volumes) because once the data is encrypted with the per-logical-volume key, the encrypted data will no longer be identical to the same data encrypted on a different logical volume with a different per-logical-volume key (said another way, data deduplication operations may not work). Even if duplicate data were detected on multiple volumes, it may be logistically difficult to delete the corresponding data, in which the corresponding data may only be completely deleted when all volumes referencing it are deleted (said another way, there is no way to guarantee that the corresponding data is not lying around in free space except by erasing the entire array).

For at least the reasons discussed above, without requiring resource (e.g., time, engineering, etc.) intensive efforts (i) to identify duplicate data and perform the identification while (a) maintaining data integrity at the maximum level and (b) keeping data secure and tamper-free, and (ii) to not subsequently discover sensitive data (after deleting the sensitive data), a fundamentally different approach is needed. Embodiments of the invention relate to methods and systems (i) to provide an additional layer of security, (ii) to improve storage space management efficiency of a storage array, and (iii) to support data compression, logical volume crypto-erasure, and physical volume-crypto erasure on a storage array. More specifically, the embodiments of the invention may first generate a per-chunk key (e.g., a per-block key, a unique key for each data chunk) and a deduplication key for a data chunk based on a hash value, in which the hash value is associated with the data chunk and the per-chunk key is stored in a metadata file. A per-volume key for a volume of a storage array may then be obtained. Thereafter, a metadata folder associated with the volume may be encrypted to generate an encrypted metadata folder using the per-volume key.

Further, the data chunk may be compressed to generate a compressed data chunk. The compressed data chunk may then be encrypted to generate an encrypted compressed data chunk using the per-chunk key, in which the encrypted compressed data chunk is stored in the volume. Upon storing, storage location information of the encrypted compressed data chunk may be obtained from the volume. A hash value lookup table may then be updated based on the storage location information. Finally, notification of a user of a client may be initiated about completion of a write request, in which the write request includes at least an identifier of the volume.

As a result of the processes discussed below, one or more embodiments disclosed herein advantageously ensure that: (i) an enterprise (or a user/administrator) improves efficiency of production workloads (e.g., reading data, writing data, etc.) and reduces storage costs, (ii) data blocks (e.g., two data chunks) can be encrypted with the same per-chunk key and the per-chunk key can be present in two metadata files (which may be encrypted with different keys), (iii) convergent encryption is performed by the storage array (e.g., the computing device that stores the corresponding data) rather than by a computing device (e.g., an application server) that processes the corresponding data, (iv) more efficient, secure, and reliable storage array-based encryption (e.g., data address encryption), decryption, and data deduplication operations (which are transparent to the computing devices that are actually processing the corresponding data) are performed so that the storage array may crypto-erase a logical volume by forgetting the corresponding per-logical-volume key (with the help of the key management server) at a later point-in-time (for example, from a server interface perspective, an application server may no longer access data of the crypto-erased volume, even though the data may still be there), (v) unnecessary encryption and/or decryption calls (where each call encrypts or decrypts a small amount of data (e.g., a data block, a data chunk, etc.)) are prevented by encrypting metadata (where the "per-chunk key" of each data chunk is stored) of each logical volume with a per-logical-volume key as metadata is written to storage, (vi) per-logical-volume keys are obtained only from a key management server (or from a lockbox) and not stored on a stable storage device (e.g., a physical drive) (or may be kept in a dynamic random access memory (DRAM) of the stable storage device for a period of time), because otherwise the stable storage device will not reliably forget the per-logical-volume keys, (vii) crypto-erasure of encrypted data (stored in a storage array) is enabled to prevent data from being recoverable by any means (e.g., destruction of the encrypted data is enabled via the destruction of the encryption keys used to encrypt the data rather than identifying each location where the data is stored in order to perform data overwriting), (viii) data deduplication performed on plaintext data (because (a) encryption may prevent deduplication of the encrypted data and (b) for data security reasons, it is undesirable to distribute encryption keys to a storage array so that encrypted data transferred to the storage array may be decrypted for data deduplication), (ix) data integrity and reliability are being kept at the maximum level (with almost zero downtime on operations and/or interruption in services), (x) risks/threats that are posed to storage arrays (and all the related physical and/or logical components of those storage arrays) are prevented (for example, deleted sensitive data is not forensically recoverable from a discarded physical drive), (xi) encryption of data is allowed to prevent forensic recovery while data compression and deduplication are still allowed, and (xii) any possible latency is being kept at the minimum level to provide (a) an efficient and reliable, for example, data retrieval operation, and (b) a better user experience to one or more users of storage arrays.

The following describes various embodiments of the invention.

FIG. 1 shows a diagram of a system (100) in accordance with one or more embodiments of the invention. The system (100) includes any number of clients (110), a key management server (122), a storage array (124), any number of servers (126), and a network (130). The system (100) may include additional, fewer, and/or different components without departing from the scope of the invention. Each component may be operably connected to any of the other components via any combination of wired and/or wireless connections. Each component illustrated in FIG. 1 is discussed below.

In one or more embodiments, the clients (110), the key management server (122), the storage array (124), and the servers (126), may be physical or logical devices, as discussed below. While FIG. 1 shows a specific configuration of the system (100), other configurations may be used without departing from the scope of the invention. For example, although the clients (110) and the servers (126) are shown to be operatively connected through a communication network (e.g., 130), the clients (110) and the servers (126) may be directly connected. As yet another example, although the clients (110) and the storage array (124) are shown to be operatively connected through a communication network (e.g., 130), the clients (110) and the storage array (124) may be directly connected.

Further, the functioning of the key management server (122) and the servers (126) is not dependent upon the functioning and/or existence of the other components (e.g., devices) in the system (100). Rather, the key management server (122) and the servers (126) may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job.

As used herein, the term "data" is intended to be broad in scope. In this manner, that term embraces, for example (but not limited to): data segments that are produced by data stream segmentation processes, data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the disclosure are not limited to any particular form of representing and storing data or other information. Rather, such principles are equally applicable to any object capable of representing information.

In one or more embodiments, the components of the system (100) may deliver at least computing power (e.g., data deduplication may be performed using the computing power of the storage array (124)), storage capacity (e.g., to store encrypted data in the storage array (124), in which the corresponding plaintext is received from the clients (110) over the network (130)), and data protection (e.g., software-defined data protection) as a service to users of the clients (110). The system (100) may also represent a comprehensive middleware layer executing on computing devices (e.g., 600, FIG. 6) that supports virtualized application environments. In one or more embodiments, the system (100) may support one or more virtual machine (VM) environments (e.g., the servers (126)), and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

As used herein, "computing" refers to any operations that may be performed by a computer, including (but not limited to): computation, data storage, data retrieval, communications, etc.

As used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, as being a physical computing device or a logical computing device (e.g., a VM), a data center (not shown) may be configured for hosting the servers (126) and maintaining various workloads, and/or for providing a computing environment (e.g., computing power and storage) whereon workloads may be implemented. In general, a data center's (e.g., a site's, a node's, etc.) infrastructure is based on a network of computing and storage resources that enable the delivery of shared applications and data. For example, a data center of an organization may exchange data with other data centers of the same organization registered in/to the network (130) in order to, for example, participate in a collaborative workload placement. As yet another example, a data center may split up a request (e.g., an operation, a task, an activity, etc.) with another data center, coordinating its efforts to complete the request (e.g., to generate a response) more efficiently than if the data center had been responsible for completing the request. One of ordinary skill will appreciate that the data center may perform other functionalities without departing from the scope of the invention.

In one or more embodiments, the data center may be capable of providing the aforementioned functionalities/services to the user of the clients (110). However, not all of the users may be allowed to receive all of the services. For example, the priority (e.g., the user access level) of a user may be used to determine how to manage computing resources (e.g., of the servers (126)) within the data center to provide services to that user. As yet another example, the priority of a user may be used to identify the services that need to be provide to that user. As yet another example, the priority of a user may be used to determine how quickly communications (for the purposes of providing services in cooperation with the network (130) (and its subcomponents)) are to be processed by the network (130).

Further, consider a scenario where a first user is to be treated as a normal user (e.g., a user with a user access level of 4/10). In such a scenario, the user level of that user may indicate that certain ports (of the subcomponents of the network (130)) are to be opened, other ports are to be blocked so that (i) certain services are to be provided to the user by the data center and (ii) network traffic from that user is to be afforded a normal level of quality (e.g., a normal processing rate). In contrast, a second user may be determined to be a high priority user (e.g., a user with a user access level of 9/10). In such a case, the user level of that user may indicate that more ports are to be opened than were for the first user so that (i) the data center may provide more services to the second user and (ii) network traffic from that user is to be afforded a high level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a NAS, a database, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), etc.

As used herein, a "policy" is a collection of information, such as a backup policy or other data protection policy, that includes, for example (but not limited to): identity of source data that is to be protected, backup schedule and retention requirements for backed up source data, identity of a service level agreement (SLA) (or a rule) that applies to source data, identity of a target device where source data is to be stored, etc.

As used herein, the term "backup" is intended to be broad in scope. In this manner, example backups in connection with which embodiments of the invention may be employed include (but not limited to): full backups, partial backups, clones, snapshots, incremental backups, differential backups, etc.

As used herein, a "rule" is a guideline used by an SLA component to select a particular target device (or target devices), based on the ability of the target device to meet requirements imposed by the SLA. For example, a rule may specify that an HDD having a particular performance parameter should be used as the target device. A target device selected by the SLA component may be identified as part of a backup policy or other data protection policy.

As used herein, an "SLA" between, for example, a vendor and a user may specify one or more user performance requirements (that define, for example, a target device to be chosen dynamically during, and as part of, a data protection process), for example (but not limited to): how many copies should be made of source data, latency requirements, data availability requirements, recovery point objective (RPO) requirements, recovery time objective (RTO) requirements, etc. In most cases, the user may be agnostic as to which particular target devices are used, as long as the user performance requirements are satisfied.

In one or more embodiments, data protection policies used to protect massive amounts of data may require a certain level of intelligence to infer SLAs of a user and provide ease of implementing data protection by reducing manual effort as much as possible to meet user expectations (or user demands). Further, a data protection policy may be defined and implemented to determine target device(s) that are best suited to meet user SLAs (that are defined within the policy). In some cases, user SLAs may be assigned to particular data protection policies for different types of data protection workloads.

As used herein, a "container" is an executable unit of software in which an application code is packaged, along with its libraries and dependencies, so that it can be executed anywhere. To do this, a container takes advantage of a form of OS virtualization in which features of the OS are leveraged to both isolate processes and control the portion of a central processing unit (CPU), memory, and a disk that those processes have access to.

As used herein, a "file system" is a method that an OS (e.g., Microsoft® Windows, Apple® MacOS, etc.) uses to control how data is named, stored, and retrieved. For example, once a user has logged into a computing device (e.g., 600, FIG. 6), the OS of that computing device uses the file system (e.g., new technology file system (NTFS), a resilient file system (ReFS), a third extended file system (ext3), etc.) of that computing device to retrieve one or more applications to start performing one or more operations (e.g., functions, tasks, activities, jobs, etc.). As yet another example, a file system may divide a volume (e.g., a logical drive) into a fixed group of bytes to generate one or more blocks of the volume.

As used herein, a "cloud" refers to servers that are accessed over the Internet (and the software and databases that executes on those servers). With the help of cloud (or "cloud computing"), users or organizations do not need to manage physical servers themselves or execute software application on their own computing devices. In most cases, a cloud enables users to access same files and/or applications from almost any computing device, because the computing and storage take place on servers, instead of locally on users' computing devices. For example, a user may log into the user's email account on a new computing device and still may find the email account in place with all email conversion history.

In most cases, data storage systems generate and store their own cryptographic keys. However, storing keys on the same storage system as the encrypted data may increase the probability of the keys being lost or accessed by unauthorized users/parties. Further, encryption keys (and/or decryption keys) may become compromised because of technical reasons or due to unauthorized parties (e.g., hackers, malicious users, etc.) gaining access to the keys. For example, a key may be sent to the wrong party inadvertently or an administrator may access the keys for unscrupulous purposes. As yet another example, due to technical reasons, keys generated by a data storage system/server (e.g., the storage array (124)) itself may not be trustworthy.

Therefore, some data storage systems (or users) utilize an external/remote key manager (e.g., the key management server (122)) to generate, store, transmit, and/or delete keys (e.g., to perform key related operations) separately from the corresponding data storage system because (i) an external key manager is usually more secure (which makes it much harder to covertly discover cryptographic keys) for generating, storing, transmitting, and/or deleting (e.g., forgetting, discarding, etc.) cryptographic keys than a data storage system and (ii) an external key manager is typically a fairly simple, self-contained system that is not downloading potentially malicious applications (e.g., software).

For at least the reasons discussed above, users (discussed below) may utilize the key management server (122) to obtain encryption keys (and/or decryption keys), in which the users assume that the key management server (122) (i) is more secure for generating, storing, transmitting, and/or deleting cryptographic keys (for example, for forgetting per-logical-volume keys in order to crypto-erase the corresponding volumes) and (ii) is needed to improve security and reliability of data and keys (so that, for example, an actual per-logical-volume key capable of decrypting a metadata folder (e.g., a metadata table) associated with a logical volume is not divulged to any unauthorized parties when the logical volume is crypto-erased).

In one or more embodiments, as being an external cryptographic key manager (remote to the storage array (124)), the key management server (122) may include a random number generator to generate cryptographic keys (e.g., encryption keys, decryption keys, etc.) for use (i) in encrypting data items for storage in the storage array (124) or (ii) in decrypting data items for retrieval from the corresponding drive of the storage array (124). As described above, the key management server (122) may generate, store, transmit, and/or delete (where deleting a key may make all of the stored encrypted compressed data inaccessible to one or more clients) one or more keys for one or more volumes/drives of the storage array (124). Each key stored on the key management server (122) may be associated with a particular volume (e.g., a per-logical-volume key). In one or more embodiments, the key management server (122) may store a single key, as well as two or more keys (in which a second key may be generated by a second key management server (not shown) and transmitted to the key management server (122) for storage). The key management server (122) may also store one or more keys for each volume. In other words, the storage array (124) may store multiple keys for a volume on the key management server (122) (which is coupled to the storage array (124)).

As used herein, "data item" is intended to be broadly construed to encompass, for example, a block, a chunk, file, object, or other grouping of data suitable for storage in the storage array (124).

As used herein, "encryption" (e.g., a symmetric or asymmetric encryption) is the process of encoding data based on a cryptographic key (e.g., the process of applying a model to a data chunk using an encryption key to generate an encrypted data chunk). For example, an encryption module (e.g., 230, FIG. 2) may take a fixed-size block (e.g., a 128-bit data chunk) and a cryptographic key, and convert that fixed-size block into a ciphertext block. As yet another example, data storage systems frequently utilize "data at rest encryption" to prevent data being accessed by unauthorized users/parties and/or other information leaks. In this manner, only an authorized user/party having the appropriate cryptographic key is able to decrypt the data. An unauthorized user/party intercepting the encrypted data is unable to read or utilize the encoded data without the appropriate key. In one or more embodiments, a data encryption/decryption operation may be performed according to different cryptographic modes/models, for example (but not limited to): a cipher block chaining (CBC) mode, a ciphertext stealing (XTS) mode, a Galois/Counter Mode (GCM), etc.

In one or more embodiments, the key management server (122) may generate one or more pre-encrypted keys by employing a key encryption algorithm to generate a random number as it would to generate any other secret key (e.g., a per-logical-volume key). This may be possible because most encryption algorithms, such as advanced encryption standard (AES), use any number of correct size bits. Any random number of a correct key size is encrypted (or decrypted) with a key to generate another number of the correct size to be used as a cryptographic key. Examples of key sizes may include, but not limited to: a 128-bit key size, a 192-bit key size, a 256-bit key size, etc. In one or more embodiments, the key bit size may also be referred to as a "key length".

In one or more embodiments, the key management server (122) may further include functionality to, e.g.: (i) reliably discard (or delete) a per-logical-volume key (or a per-physical-volume key) to crypto-erase data chunks contained within the corresponding logical volume (or the corresponding physical volume), in which (a) this process may still be effective even if data stored on the logical volume is only marked as free and not actually erased because any data that remains behind in freed space may not be recovered without the per-logical-volume key, and (b) when the data chunks are erased, the mappings between the data chunks and the keys may be updated such that no attempt is made to re-encrypt the data chunks that have been erased; (ii) perform data protection related (or key related) operations (e.g., key management operations, key policy operations, key introduction operations, re-keying operations (may be mandatory when a per-volume key reaches its maximum age so that data security may be kept at a maximum level and a collective or an average key age may be kept below a predetermined age), managing existing keys, deleting older keys, etc.), in which (a) the key related operations may be used to manage how data is encrypted or decrypted, (b) the associated policies may determine when keys are introduced, how many keys are allowed, when data is re-keyed, and the like, and (c) the aforementioned operations may be independent of each other and may be performed asynchronously or synchronously; (iii) include an agent that perform the aforementioned operations using resources that are available (e.g., not being used by another workload) in the key management server (122), in which by using the available resources (or performing these operations in the background), the agent may avoid having to specifically allocate resources to the operations that could impact the performance of other workloads, (iv) operate to ensure that data of the storage array (124) is encrypted using one or more keys and the overall (or the average) key age is kept low, for example below a predetermined age, which may reduce the likelihood that the data or the corresponding key will be compromised, (v) periodically introduce new keys into the storage array (124) so that (a) when "no duplicate" data is received by the storage array (124), metadata associated with the data (more specifically, data chunks of the data) may be encrypted with the latest key (to prevent a "compromised key" issue), (b) when resources (e.g., processing resources (e.g., resources of the processing unit (e.g., 210, FIG. 2)), storage resources (resources of the drives (e.g., 270, FIG. 2)), etc.) are available in the storage array (124), data encrypted with older keys may be re-keyed with the latest keys, and (c) when data is re-keyed, keys that are no longer needed for decryption purposes may be deleted, and (vi) ensure that, before deleting a specific key (e.g., a per-logical-volume key), no data is still encrypted with that specific key. One of ordinary skill will appreciate that the key management server (122) may perform other functionalities without departing from the scope of the invention.

Figure 6:
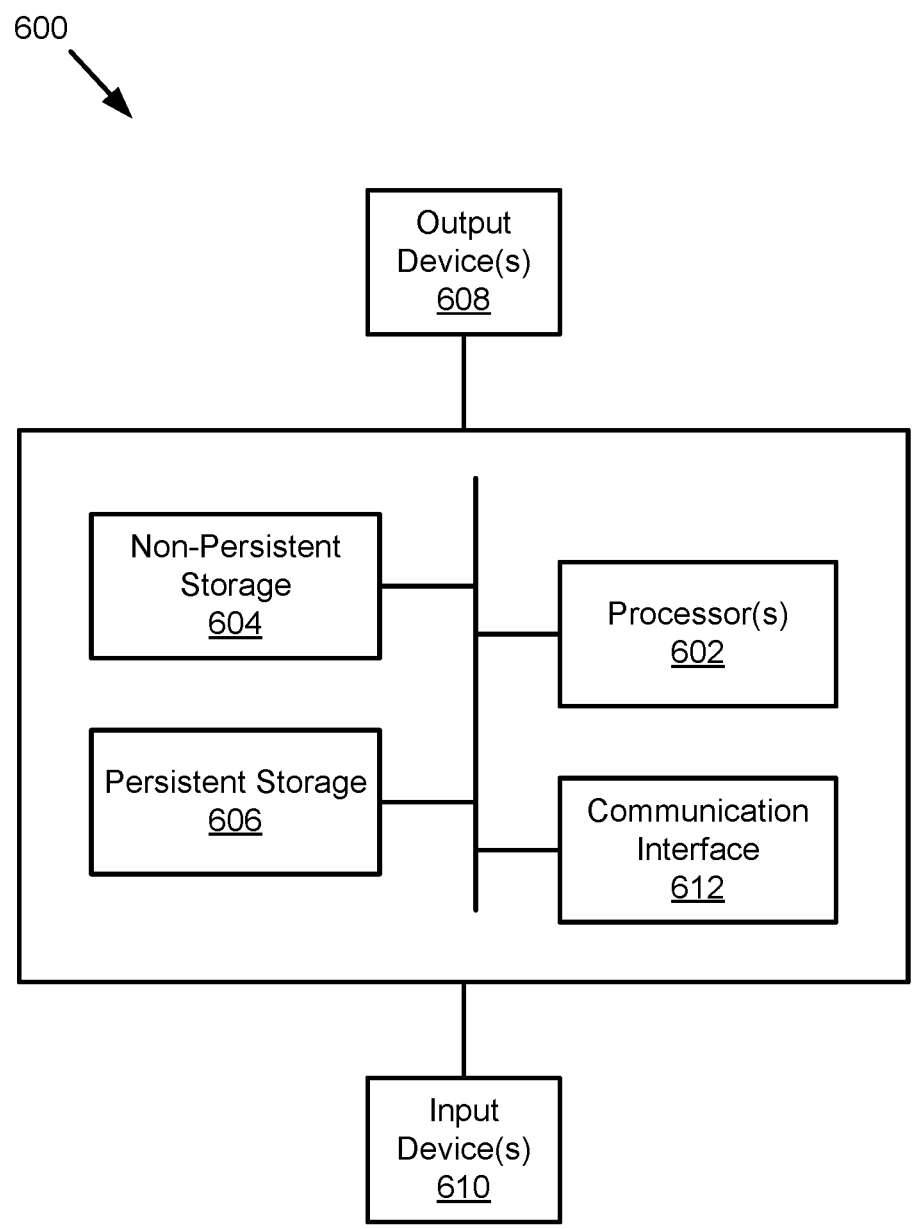
FIG. 6 shows a diagram of a computing device in accordance with one or more embodiments of the invention.

In one or more embodiments, the key management server (122) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., random access memory (RAM)), and persistent storage (e.g., disk drives, SSDs, etc.). The computing device may include instructions, stored in the persistent storage, that when executed by the processor(s) of the computing device cause the computing device to perform the functionality of the key management server (122) described throughout this application.

Alternatively, in one or more embodiments, the key management server (122) may be implemented as a logical device. The logical device may utilize the computing resources of any number of computing devices to provide the functionality of the key management server (122) described throughout this application.

In one or more embodiments, as being a storage server (or a storage system (e.g., a SAN infrastructure, a NAS infrastructure, a NAS cluster, etc.)) that processes incoming data from the clients (110) and/or from the servers (126) (via its processing unit (e.g., 210, FIG. 2)), the storage array (124) may be configured to, e.g.: (i) store encrypted and/or unencrypted data (e.g., store any information utilized by the clients (110) and/or by the servers (126)), (ii) perform data encryption and decryption operations (using cryptographic keys as well as generating or otherwise obtaining and updating such keys), (iii) perform data compression and decompression operations, (iv) perform data deduplication operations on unencrypted data, and (v) host one or more computational modules for servicing requests received from the clients (110) to access data on the drives (e.g., Drive A (270A), Drive B (270B), etc., FIG. 2) and/or for servicing requests received from the servers (126) to access data on the drives (e.g., 270A, 270B, etc., FIG. 2).

Figure 2:
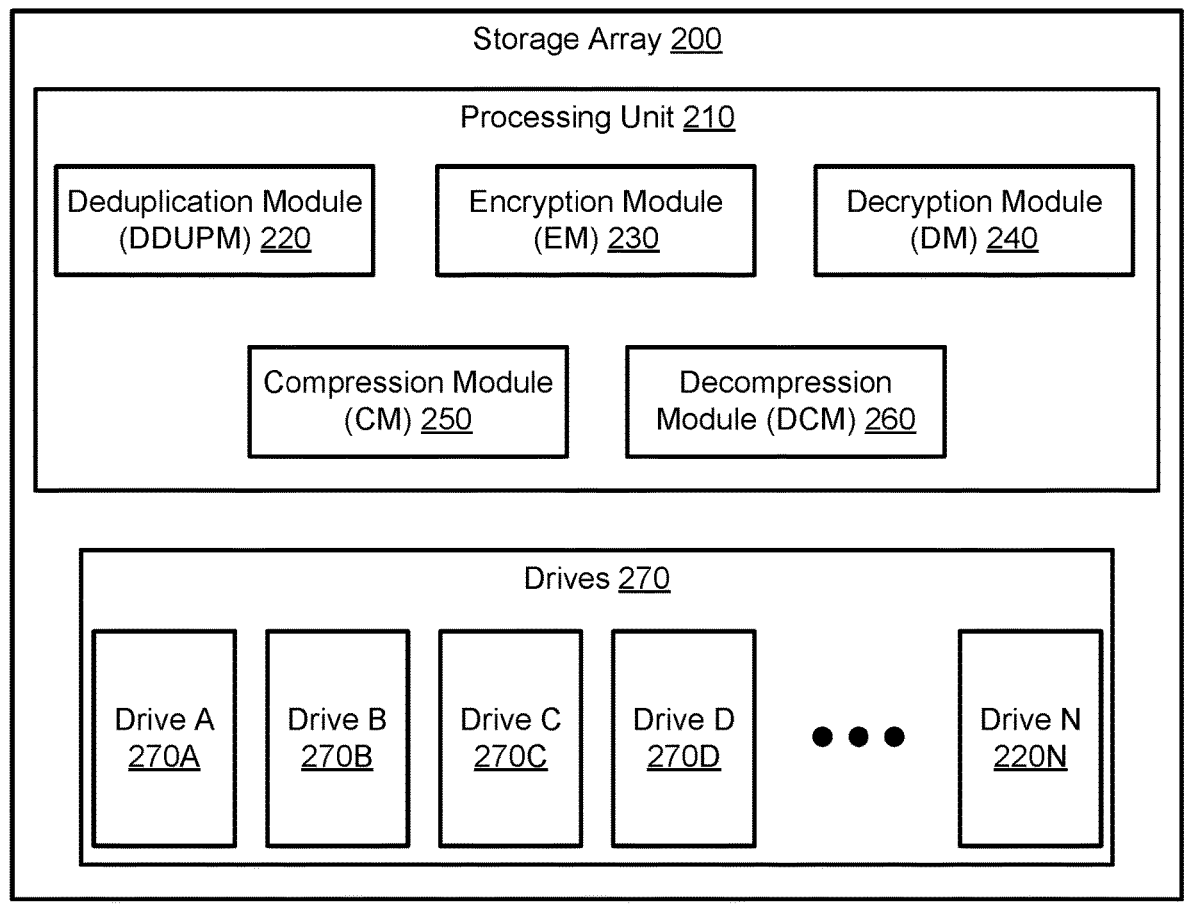
FIG. 2 shows a diagram of a storage array in accordance with one or more embodiments of the invention.

In one or more embodiments, the storage array (124) may be a SAN infrastructure (e.g., a networked storage solution), in which the storage array (124) may provide high-performance and low-latency network access to the drives (e.g., 270A, 270B, etc., FIG. 2). In one or more embodiments, the storage array (124) may include, for example, one or more hosts (e.g., a metadata server, a data replication server, a management server, etc.), one or more switches (e.g., a Fibre Channel (FC) switch, an Ethernet switch, an InfiniBand switch, etc.), one or more gateways (to move data between different storage arrays), and one or more storage devices (or drives) (e.g., RAID, a storage pool, a virtual storage resource for access by a remotely located computing device, one or more databases, cloud storage, etc.) that are interconnected using a variety of technologies, interfaces, topologies, and protocols (e.g., FC, Internet small computer systems interface (iSCSI), SCSI, nonvolatile memory express (NVMe), Fibre Connection (FICON), Fibre Channel over Ethernet (FCOE), remote direct memory access (RDMA), secure remote password (SRP), etc.). In one or more embodiments, the RAID (or the RAID module) may store data redundantly so that the failure of any drive (of the storage array (124)) will not cause any data to be lost.

In one or more embodiments, through different types of virtualization, the storage array (124) may present storage devices (or drives) to a host such that the storage devices appear to be locally attached. More specifically, storage traffic over, for example, FC avoids TCP/IP packetization and latency issues, as well as any LAN congestion, ensuring the highest simultaneous access speed available for media and mission critical stored data. Further, the storage array (124) may be used to, for example (but not limited to): improve application (and/or data) availability (e.g., via multiple data paths, internal fallback (e.g., hardware redundancy) mechanisms, etc.), enhance application performance of the servers (126) (e.g., via off-load storage functions, segregate networks, etc.), increase storage utilization and effectiveness (e.g., by consolidating storage resources, providing tiered storage, etc.), etc.

In one or more embodiments, the storage array (124) may provide data protection (e.g., data backup, data replication, data management, data restore, etc.) services to the clients (110) (or any other component of the system (100)). The data protection services may initiate generation and storage of backups (e.g., block-based backups, file-based backups, etc.) in the storage array (124). The data protection services may also include restoration of the clients (110) (or any other component of the system (100)) to a restoration host (not shown) using the backups stored (temporarily or permanently) in the storage array (124).

Further, the storage array (124) may provide data protection services to the clients (110) (or any other component of the system (100)) by orchestrating (or scheduling): (i) generation of backups of the clients (110), (ii) storage of the generated backups of the clients (110), (iii) consolidation of one or more backup requests to reduce (or to prevent) generation of backups that are not useful for restoration purposes, and (iv) restoration of the clients (110) to previous states using backups stored in the storage array (124). Further, to provide the aforementioned services, the storage array (124) may include functionality to generate and issue instructions to any other component of the system (100). The storage array (124) may also generate instructions in response to data protection requests from other entities.

In one or more embodiments, in order to provide the above-mentioned functionalities, the storage array (124) may need to communicate with other components of the system (100) with minimum amount of latency (e.g., with high-throughput (e.g., a high data transfer rate) and sub-millisecond latency). For this reason, representational state transfer application programming interfaces (REST APIs) may be used to enable communication(s) between the storage array (124) and the other components.

As used herein, a "REST API" is an interface that two computing devices use to exchange data securely over the Internet (or to exchange data internally). More specifically, the term "REST" defines a set of rules and constraints (not a protocol or a standard) that need to be followed when building a communication path(s). Any computing device that adheres to those rules and constraints will be able to communicate via a set of uniform, shared, and stateless (or stateful) operators and requests. APIs denote the underlying code that, if it conforms to the set of rules and constraints, allows computing devices to communicate with one another.

In operation, REST APIs use HTTP to communicate. More specifically, REST APIs communicate via HTTP to perform standard database functions such as, for example, creating, reading, updating, and deleting records within a resource. For example, a well-designed REST API is similar to a webpage executing on a web browser with built-in HTTP functionality. As used herein, "HTTP" is a request/response protocol that is used in cases in which a synchronous request/response is required. This means that computing devices making requests via REST APIs must be designed to expect an immediate response. If the client receiving the response is down, the sending service may be blocked while it awaits for the response. To prevent this, failover and error handling logic may be applied to (or built into) both applications.

In one or more embodiments, in order to obtain (or receive) one or more per-logical-volume keys (or per-physical-volume keys) from the key management server (122), the storage array (124) may utilize, for example, key management interoperability protocol (KMIP) to communicate with the key management server (122). KMIP is a network protocol providing standards for communications between storage systems and key managers. However, the storage array (124) may utilize other types of protocols to communicate with the key management server (122) without departing from the scope of the invention.

In one or more embodiments, the storage array (124) may maintain a "hash value lookup table" as storage object information (e.g., data chunk to hash value metadata). The hash value lookup table may represent (or specify) an index (e.g., a deduplication index, a deduplication directory, etc., which is utilized in detecting duplicate data chunks) where the hash values for stored data chunks may be maintained in that index. For example, a hash value of a data chunk (as being a digital signature that uniquely identifies an associated data chunk) being considered may be looked-up in the hash value lookup table. If an entry is found for that hash value, then a redundant data chunk is identified, and that data chunk may be replaced with a pointer to the matching data chunk (e.g., a pointer to a single copy of the matching data chunk) maintained in storage (e.g., in the corresponding drive). In this manner, the deduplication module (e.g., 220, FIG. 2) only stores the non-redundant data chunks in the corresponding drive.

Further, the hash value lookup table may specify "file to data chunk metadata", in which (i) it may include an ordered list of data chunks (indicating the order that the data chunks appear in the file (e.g., the data, etc.)) and (ii) a data chunk may be uniquely identified by a hash value and a data chunk size. In one or more embodiments, the file to data chunk metadata may specify one or more data chunks and an identifier of each data chunk, in which the data chunks may be of variable length, i.e., have the same or different lengths. In this manner, the file to data chunk metadata may provide information about the data chunks included in a file, such as a hash value and length, but not the actual data.

The hash value lookup table may also specify a "storage location map" representing a repository for maintaining hash identifiers (of the corresponding hash values). Each hash value may be indexed by way of a store location map entry (as part of a storage location directory), which may store a mapping relating a hash identifier to a storage location identifier. In one or more embodiments, a storage location identifier may represent a character or bit string that uniquely identifies a storage location on a drive (e.g., 270A, 270B, etc., FIG. 2). For example, a storage location identifier may encompass a tuple reflecting (a) a drive identifier uniquely assigned to a given physical drive of the storage array (124) and (b) a binary address assigned to a starting byte (or a storage block) in the given physical drive at which the corresponding data chunk may be physically or logically stored. In one or more embodiments, based on the storage location map, a data retrieval operation (initiated by a user at a later point-in-time) may be performed much faster (see FIG. 3.3).

In one or more embodiments, the hash value lookup table may be maintained by, for example, the deduplication module (e.g., 220, FIG. 2). The deduplication module (e.g., 220, FIG. 2) may add, remove, and/or modify information included in the hash value lookup table. The deduplication module (e.g., 220, FIG. 2) may do so based on information or a request/call obtained from administrators, other data structures, and/or from other sources (e.g., the servers (126)). The data structures of the hash value lookup table may be implemented using, for example, lists, tables, unstructured data, databases, etc. While described as being stored locally, the hash value lookup table (or various portions thereof) may be stored remotely and may be distributed across any number of devices (e.g., may be stored at alternative locations within the system (100)) without departing from the invention. In one or more embodiments, an administrator may be a user with permission (e.g., a user that has root-level access) to make changes on the storage array (124) that will affect other users of the storage array (124).

In one or more embodiments, the storage array (124) may also maintain a metadata folder associated with each physical drive (or physical volume) or logical volume. Each metadata folder may include, for example (but not limited to): one or more metadata files (in which each metadata file may include a per-chunk key for a data chunk as each data chunk is assumed to have a different key); an aspect of mapping data to per-chunk keys (e.g., a metadata folder may include information about one or more data chunks that will be encrypted or already encrypted for storage in the storage array (124) using respective data encryption keys (e.g., per-chunk keys)); a key index that represents a lifecycle (and/or a status) of each per-chunk key (e.g., an expired key (e.g., a key that is older than a predetermined (maximum) age (which may be tuned by a user)), a non-expired key, a current or in-use key, a latest key, etc.), in which keys whose states are expired may be flagged for removal or deletion; etc.

In one or more embodiments, the metadata folder may be maintained by, for example, the metadata server (not shown). The metadata server may add, remove, and/or modify information included in the metadata folder. The metadata server may do so based on information or a request/call obtained from administrators, other data structures, and/or from other sources (e.g., the servers (126)). The data structures of the metadata folder may be implemented using, for example, lists, tables, unstructured data, databases, etc. While described as being stored locally, the metadata folder (or various portions thereof) may be stored remotely and may be distributed across any number of devices (e.g., may be stored at alternative locations within the system (100)) without departing from the invention.

In one or more embodiments, the storage array (124) may provide an authorization service. The authorization service may obtain authentication requests (from one or more components of itself, for example, the deduplication module (e.g., 220, FIG. 2) and the encryption module (e.g., 230, FIG. 2)) that specify credentials of a client of the clients (110) (or a server of the servers (126)) that sends a write request for data to a volume. The credentials may be verified by the authorization service, and confirmation of the validity of the credentials may be provided to the corresponding component of the storage array (124). The validity may be used to determine whether a data deduplication operation, a data encryption operation, and/or a data decryption operation may be safely initiated. In this manner, for example, a decryption of a secret stored in a drive as initiated by a malicious entity may be prevented.

In one or more embodiments, a secret is sensitive data that is not intended to be accessible to any entity except the corresponding client. The secret may be, for example, a password. While only the corresponding client is intended to access the secret, malicious entities may attempt to access the storage array (124) and obtain the secret without the permission of an intended user of the client. Because of this possibility, the client, rather than storing the secret as is, may store an encrypted version of the secret (also referred to as the encrypted secret) in the storage array (124). The encrypted secret may not be decrypted without the help of the key management server (122).

One of ordinary skill will appreciate that the storage array (124) may perform other functionalities without departing from the scope of the invention. In one or more embodiments, the storage array (124) may be configured to perform all, or a portion, of the functionalities described in FIGS. 3.1-3.3. Additional details of the storage array are described below in reference to FIG. 2.

In one or more embodiments, the storage array (124) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the storage array (124) described throughout this application.

Alternatively, in one or more embodiments, similar to the key management server (122), the storage array (124) may also be implemented as a logical device.

In one or more embodiments, the key management server (122) and the storage array (124) may be implemented as dedicated and protected system components that are PIPS-certified, where PIPS denotes Federal Information Processing Standards, such as PIPS 140-1 and 140-2 relating to security of cryptographic modules.

In one or more embodiments, as being a physical computing device or a logical computing device (e.g., a VM), a server of the servers (126) may be configured for, e.g.: (i) hosting and maintaining various workloads, (ii) providing a computing environment (e.g., computing power and storage) whereon workloads may be implemented, (iii) providing computer-implemented services (e.g., receiving a request, sending a response to the request, etc.) to one or more entities (e.g., users, components of the system (100), etc.), and (iv) exchanging data with other components registered in/to the network (130) in order to, for example, participate in a collaborative workload placement. In one or more embodiments, in order to read, write, or store data, a server may communicate with the storage array (124). One of ordinary skill will appreciate that the server may perform other functionalities without departing from the scope of the invention.

For example, a server may split up a request with another component of the system (100), coordinating its efforts to complete the request (e.g., to generate a response) more efficiently than if the server had been responsible for completing the request. In one or more embodiments, a request may be, for example (but not limited to): a web browser search request, a REST request, a computing request, a database management request, a registration request, a file upload/download request, etc. To provide computer-implemented services to one or more entities, the server (e.g., an enterprise server, a modular server, a blade server, a mainframe, a workstation computer, etc.) may perform computations locally and/or remotely. By doing so, the server may utilize different computing devices (e.g., 600, FIG. 6) that have different quantities of computing resources (e.g., processing cycles, memory, storage, etc.) to provide a consistent experience to the entities. In one or more embodiments, the server may be a heterogeneous set, including different types of hardware components and/or different types of OSs.

In one or more embodiments, a server of the servers (126) may host any number of applications (and/or content accessible through the applications) that provide application services to the clients (110). Application services may include, for example (but not limited to): database services, electronic communication services, instant messaging services, file storage services, web-based services, desktop-based services, workload placement collaboration services, serving (e.g., processing) a request, sharing an application log, receiving computing resource details of a node, transmitting a request, analyzing data, streaming video, etc. In order to provide application services, each application may host similar or different components. The components may be, for example (but not limited to): instances of databases, instances of email servers, etc.

Further, applications may vary in different embodiments, but in certain embodiments, applications may be custom developed or commercial (e.g., off-the-shelf) applications that a user desires to execute in the server. In one or more embodiments, applications may be logical entities executed using computing resources of the server. For example, applications may be implemented as computer instructions, e.g., computer code, stored on persistent storage of the server that when executed by the processor(s) of the server cause the server to provide the functionality of the applications described throughout the application.

In one or more embodiments, while performing, for example, one or more operations requested by a user of a client of the clients (110), applications installed on the server may include functionality to request and use resources (e.g., data, computing resources, etc.) of the server. Applications may also perform other types of functionalities not listed above without departing from the scope of the invention. In one or more embodiments, while providing application services to a user, applications may store (temporarily or permanently) data that may be relevant to the user in the persistent storage of the server.

In one or more embodiments, a server of the servers (126) may provide computer-implemented services to the clients (110) (and/or other components of the system (100)). The server may provide any quantity and any type of computer-implemented services (e.g., data storage services, electronic communication services, etc.). To provide computer-implemented services, the server may include a collection of physical components (e.g., processing resources, storage/memory resources, networking resources, etc.) configured to perform operations of the server and/or otherwise execute a collection of logical components (e.g., virtualization resources) of the server. A portion of the collection of physical and logical components are described below.

In one or more embodiments, a server of the servers (126) may include any number of VMs that host the above-discussed applications. The VMs may be logical entities executed using the physical and logical components of the server, or using computing resources of other computing devices connected to the server. Each of the VMs may perform similar or different processes. In one or more embodiments, the VMs (and applications hosted by the VMs) may generate data (e.g., VM data) that is stored in the persistent storage of the server, in which the VM data may reflect a state of a VM.

In one or more embodiments, VMs may provide services (e.g., application services) to the clients (110). For example, VMs may host instances of databases, email servers, and/or other applications that are accessible to the clients (110). The VMs may host other types of components not listed above without departing from the scope of the invention.

In one or more of embodiments, VMs may be implemented as computer instructions, e.g., computer code, stored in the persistent storage that when executed by the processor(s) of the server cause the server to provide the functionality of the VMs described throughout the application.

In one or more embodiments, the server may include a hypervisor. The hypervisor may be configured to orchestrate the operation of the VMs by allocating the physical and logical components to each of the VMs. In one or more embodiments, the hypervisor may be a physical device including circuitry, for example (but not limited to): a field-programmable gate array, an application-specific integrated circuit (ASIC), a programmable processor, a microcontroller, a digital signal processor, etc. The physical device may be adapted to provide the functionality of the hypervisor described throughout the application. Alternatively, similar to the VMs, the hypervisor may also be implemented as computer instructions.

In one or more embodiments, a server may also include a production agent, which is configured to locally orchestrate the performance of data protection operations. For example, the production agent may perform a data protection operation under the direction of a client, in which the client sends instructions to the production agent regarding: (i) when one or more operations should be performed, (ii) where the resulting data backup(s) should be stored (temporarily or permanently), and (iii) when a VM should be restored to a previous state. Other instructions not listed above may also be sent without departing from the scope of the invention.

In one or more embodiments, to orchestrate the performance of one or more data operations, the production agent may issue commands to the hypervisor to manage one or more VMs when a backup of those VMs is being performed, or when a restoration of those VMs is being performed. In one or more embodiments, the production agent may be implemented using hardware, software, or any combination thereof.

In one or more embodiments, the server may include functionality to: (i) consolidate multiple data process or protection requests (received from, for example, the clients (110)) so that duplicative operations (which may not be useful for restoration purposes) are not generated, and (ii) initiate multiple data process or protection operations in parallel. For example, the production agent may host multiple operations. Each of the multiple operations may (a) manage the initiation of a respective operation and (b) operate concurrently to initiate multiple operations.

In one or more embodiments, a server of the servers (126) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the server described throughout the application.

Alternatively, in one or more embodiments, similar to the key management server (122), the server may also be implemented as a logical device.

In one or more embodiments, the clients (110) may be physical or logical computing devices configured for hosting one or more workloads, or for providing a computing environment whereon workloads may be implemented. The clients (110) may correspond to computing devices that one or more users use to interact with one or more components of the system (100).

In one or more embodiments, a client may include any number of applications (and/or content accessible through the applications) that provide computer-implemented application services to a user. Applications may be designed and configured to perform one or more functions instantiated by a user of the client. Examples of an application may include (but not limited to): a word processor, a media player, a web browser, a file viewer, an image editor, etc.

In order to provide the above-mentioned application services, each application may host similar or different components. The components may be, for example (but not limited to): instances of databases, instances of email servers, etc. Applications may be executed on one or more clients as instances of the application.

In one or more embodiments, applications may vary in different embodiments, but in certain embodiments, applications may be custom developed or commercial applications that a user desires to execute in a client. In one or more embodiments, applications may be logical entities executed using computing resources of a client. For example, applications may be implemented as computer instructions, e.g., computer code, stored on persistent storage of the client that when executed by the processor(s) of the client cause the client to provide the functionality of the applications described throughout the application.

In one or more embodiments, while performing, for example, one or more operations requested by a user, applications installed on a client may include functionality to request and use physical and logical components of the client. Applications may also include functionality to use data stored in storage/memory resources of the client. The applications may perform other types of functionalities not listed above without departing from the scope of the invention. In one or more embodiments, while providing application services to a user, applications may store data that may be relevant to the user in storage/memory resources of the client.

In one or more embodiments, the clients (110) may interact with the servers (126). For example, the clients (110) may issue requests to the servers (126) to receive responses and interact with various components of the servers (126). The clients (110) may also request data from and/or send data to the servers (126). As yet another example, the clients (110) may utilize application services provided by the servers (126). When the clients (110) interact with the servers (126), data that is relevant to the clients (110) may be stored (temporarily or permanently) in the servers (126).

As yet another example, consider a scenario in which a server of the servers (126) hosts a database utilized by the clients (110). In this scenario, the database may be a client database associated with users of the clients (110). When a new user is identified, the clients (110) may add information of the new user to the client database. By doing so, data that is relevant to the clients (110) may be stored in the server. This may be done because the clients (110) may desire access to the information of the new user at some point-in-time.

As yet another example, a client of the clients (110) may execute an application that interacts with an application database hosted by a server of the servers (126). When an application upgrade is available to fix a critical software issue, the server may identify the client that requires the application upgrade. The application database may then provide the application upgrade to the client. By doing so, the application executed by the client may be kept up-to-date. As yet another example, the clients (110) may send instructions to the servers (126) to configure one or more VMs hosted by the servers (126). In one or more embodiments, instructions may be, for example (but not limited to): instructions to configure a backup policy, instructions to take a snapshot of VM data, etc.

As yet another example, a client of the clients (110) may initiate an application to execute on a server of the servers (126) such that the application may (itself) gather, transmit, and/or otherwise manipulate data located in the server, remote to the client. In one or more embodiments, the clients (110) may share access to more than one server and may similarly share any data located in those servers.

In one or more embodiments, the clients (110) may provide computer-implemented services to users (and/or other computing devices such as, for example, other clients or other types of components). The clients (110) may provide any quantity and any type of computer-implemented services (e.g., data storage services, electronic communication services, etc.). To provide computer-implemented services, each client may include a collection of physical components (described below) configured to perform operations of the client and/or otherwise execute a collection of logical components (described below) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a graphical processing unit (GPU), a data processing unit (DPU), a computation acceleration resource, ASICs, a digital signal processor for facilitating high speed communication, etc.

In one or more embodiments, a storage or memory resource (not shown) may refer to a measurable quantity of a storage/memory-relevant resource type, which can be requested, allocated, and consumed. A storage/memory-relevant resource type may encompass a physical device, a logical intelligence, or a combination thereof, which may provide temporary or permanent data storage functionality and/or services. Examples of a storage/memory-relevant resource type may be (but not limited to): an HDD, an SSD, RAM, Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, a client may include a memory management unit (MMU) (not shown), in which the MMU is configured to translate virtual addresses (e.g., those of a virtual address space (discussed below)) into physical addresses (e.g., those of memory). In one or more embodiments, the MMU may be operatively connected to the storage/memory resources, and the MMU may be the sole path to access the memory, as all data destined for the memory must first traverse the MMU prior to accessing the memory. Further, the MMU may be configured to: (i) provide memory protection (e.g., allowing only certain applications to access memory) and (ii) provide cache control and bus arbitration.

In one or more embodiments, while the clients (110) provide computer-implemented services to users, the clients (110) may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (110) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the invention.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card, a network adapter, a network processor, etc.

In one or more embodiments, a networking resource may provide capabilities to interface a client with external entities (e.g., other clients, the servers (126), etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transmission control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients. For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU, a virtual storage pool, etc.

In one or more embodiments, a virtualization resource may include a hypervisor, in which the hypervisor may be configured to orchestrate an operation of, for example, a VM by allocating computing resources of a client to the VM. Details of the hypervisor are described above.

In one or more embodiments, the clients (110) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the clients (110) described throughout the application.

Alternatively, in one or more embodiments, similar to the key management server (122), the clients (110) may also be implemented as logical devices.

In one or more embodiments, users may interact with (or operate) the clients (110) in order to perform work-related tasks (e.g., production workloads). In one or more embodiments, the accessibility of users to the clients (110) may depend on a regulation set by an administrator of the clients (110). To this end, each user may have a personalized user account that may, for example, grant access to certain data, applications, and computing resources of the clients (110). This may be realized by implementing the "virtualization" technology (discussed above).

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, the GUI may be displayed on a display of a computing device (e.g., 600, FIG. 6) using functionalities of a display engine (not shown), in which the display engine is operatively connected to the computing device. The display engine may be implemented using hardware, software, or any combination thereof. The login screen may be displayed in any visual format that would allow the user to easily comprehend (e.g., read and parse) the listed information.

In one or more embodiments, the network (130) may represent a computing network and/or fabric configured for computing resource and/or messages exchange among registered computing devices (e.g., the key management server (122), the storage array (124), etc.). As discussed above, components of the system (100) may operatively connect to one another through the network (130) (e.g., a storage area network (SAN), a personal area network (PAN), a local area network (LAN), a metropolitan area network (MAN), a wide area network (WAN), a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network (130) may be operably connected to the Internet or other networks. Further, the network (130) may enable interactions between, for example, the servers (126) and the clients (110) through any number and type of wired and/or wireless network protocols (e.g., TCP, UDP, Internet Protocol version 4 (IPv4), etc.). Further, the network (130) may be configured to perform all, or a portion, of the functionality described in FIGS. 3.1-3.3.

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network (130), and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of milliseconds or less) network traffic and non-real-time network traffic should be managed in the network (130). In one or more embodiments, the real-time network traffic may be high priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VOIP), etc.

In one or more embodiments, the non-real-time network traffic may be low priority (e.g., non-urgent) network traffic. For this reason, data packets of the non-real-time network traffic may not need to be prioritized in the network (130). The non-real-time network traffic may include data packets related to, for example (but not limited to): File Transfer Protocol (FTP) for web publishing, email applications, etc.

Turning now to FIG. 2, FIG. 2 shows a diagram of a storage array (200) in accordance with one or more embodiments of the invention. The storage array (200) may be an example of the storage array discussed above in reference to FIG. 1. The storage array (200) may include a deduplication module (220), an encryption module (230), a decryption module (240), a compression module (250), a decompression module (260), and one or more drives (270) (e.g., disk drives; SSDs that are the same size and have the same interfaces as a disk; physical drives; logical drives; etc.). In one or more embodiments, the storage array (200) may also include (i) an administrative interface to generate and/or delete one or more virtual/logical volumes (e.g., virtual drives) and (ii) a module to allocate storage resources of physical volumes (e.g., physical drives) for the virtual volumes. The storage array (200) may include additional, fewer, and/or different components without departing from the scope of the invention. Each component may be operably connected to any of the other component via any combination of wired and/or wireless connections. Each component illustrated in FIG. 2 is discussed below.

In one or more embodiments, the deduplication module (220), the encryption module (230), the decryption module (240), the compression module (250), and the decompression module (260) may collectively be referred to as "components of a processing unit (210)" (or may collectively be referred to as "pieces of software" that execute on the processing unit (210)), in which the processing unit (210) processes data that is being written or read by clients (e.g., 110, FIG. 1) (or the servers (e.g., 126, FIG. 1)) over the network (e.g., 130, FIG. 1). Although two modules (the encryption module (230) and the decryption module (240)) are shown for data encryption and decryption purposes, respectively, the processing unit (210) may include only one module that provides both data encryption and decryption functionalities without departing from the scope of the invention.

In one or more embodiments, the deduplication module (220) may include functionality to, e.g.: (i) reduce the required storage capacity in the corresponding drive (e.g., Drive A (270A), Drive B (270B), etc.) to improve storage efficiency of the backed up data, (ii) detect incoming redundant data based on the hash value lookup table and avoid (e.g., eliminate, prevent, etc.) storing such data (or multiple copies of that data) in the drives (270) (said another way, perform one or more data deduplication operations on given unencrypted data to ensure that multiple copies of the same data are not stored in the drives (270), even though multiple clients have requested storage of the same data), (iii) receive (or obtain) a write request for data (e.g., plaintext) to a volume (e.g., a logical volume) from a client of the clients (e.g., 110, FIG. 1) or from a server of the servers (e.g., 126, FIG. 1), (iv) divide (or break) storage objects (e.g., assets/data that are often compound storage objects including many individual storage objects (e.g., data chunks)) into one or more data chunks, (v) generate (using its hash calculation mechanism, for example, by employing a secure hash algorithm (SHA)-256 model) a hash value (e.g., a cryptographic fingerprint, hash, etc.) for each data chunk obtained in (iv), (vi) implement data deduplication on received data (for example, from multiple clients) to render deduplicated data before compression, encryption, and storage, (vii) determine whether any of data chunks are already stored (in the drives (270)) based on hash values of data chunks that are already stored in the drives (270) (more specifically, based on the previously stored hash values in the deduplication directory of the hash value lookup table (described above in reference to FIG. 1)), (viii) based on (vii), update the hash value lookup table by incrementing a pointer counter (in which the hash value lookup table maintains (a) a pointer to an existing data chunk and (b) a counter associated with this pointer), and (ix) based on (vii), populate the hash value lookup table to store hash values of unique data chunks (e.g., data units) (so that, for example, the deduplication module (220) performs an accurate data deduplication operation based on the hash value lookup table at a later point-in-time). Additional details of the deduplication module are described below in reference to FIG. 3.1.

As used herein, "data deduplication" is a method for eliminating redundant data to improve storage utilization, reduce costs, and improve performance, in which data deduplication reduces the required storage capacity (e.g., storage resource requirements) because, for example, only one copy of unique data chunk is stored. A computing environment performing data deduplication operates by dividing a storage object into a series of data chunks, in which each chunk is defined by chunk boundaries. A boundary (or a chunk boundary) refers to a position within the data that defines an endpoint of a data chunk, in which two successive boundaries define the two endpoints of a corresponding data chunk.

As described above, a storage object may be divided into data chunks and thereafter, corresponding hash values may be generated using a hash function (e.g., a rolling hash function, a SHA-256 model, a message-digest algorithm 5 (MD5) model, etc.), in which each hash value may identify the boundaries of the corresponding chunk without determining the uniqueness of the chunk. The hash may herein be referred to as the "chunk identifying hash", and the chunk identifying hash value of a data chunk may herein be referred to as the "fingerprint".

Further, data deduplication is particularly useful for systems that store data which is frequently updated or changed, as data deduplication may be performed on chunks of data rather than on an entire file so that only the changed portion of data needs to be stored.

One of ordinary skill will appreciate that the deduplication module (220) may perform other functionalities without departing from the scope of the invention. When providing its functionalities, the deduplication module (220) may perform all, or a portion, of the methods illustrated in FIG. 3.1. The deduplication module (220) may be implemented using hardware, software, or any combination thereof.

In one or more embodiments, the encryption module (230) may include functionality to, e.g.: (i) perform a convergent encryption mechanism, (ii) perform "encryption at rest" (a type of encryption to help protect data that is stored on a disk (e.g., SSDs, backup media, etc.)) with keys (e.g., per-chunk keys) to encrypt data (or data chunks), (iii) perform a data encryption operation in conjunction with the drives (270), in which, after the encryption, the encryption module (230) stores the encrypted data in the corresponding drive, (iv) based on a hash value of a unique data chunk, generate (in conjunction with the deduplication module) a per-chunk key associated with the unique data chunk (e.g., perform one or more hash operations on a data chunk to generate a per-chunk key (e.g., a data encryption key)), (v) store a per-chunk key in a metadata file associated with a unique data chunk. (vi) obtain (or receive) a per-volume key (e.g., a per-logical-volume key) from the key management server (e.g., 122, FIG. 1), (vii) encrypt a metadata folder (for example, (a) associated with a logical volume and (b) that includes one or more metadata files of the corresponding data chunks) using a per-logical-volume key (or using a per-physical-volume key), which is (a) obtained from the key management server (e.g., 122, FIG. 1) and (b) not internally generated (or never seen before), (viii) store an encrypted metadata folder in the corresponding volume, (ix) utilize one or more services provided by the key management server (e.g., 122, FIG. 1) to initiate encryption and/or storage of an encrypted data chunk, (x) manage (in conjunction with the deduplication module (220) and the compression module (250)) all writing of data items in the corresponding drive/volume (e.g., 270A, 270B, etc.), (xi) by employing a set of linear, non-linear, and/or machine learning (ML)-based data encryption models, encrypt a compressed data chunk (where the compressed data chunk is generated by the compression module (250) and sent to the encryption module (230)) using an associated per-chunk key to generate an encrypted compressed data chunk, (xii) store an encrypted compressed data chunk in the corresponding volume, (xiii) obtain storage location information of an encrypted compressed data chunk from the corresponding volume, (xiv) based on (xiii) update the hash value lookup table, and (xv) initiate notification of a user of a client of the clients (e.g., 110, FIG. 1) (or a user of a server of the servers (e.g., 126, FIG. 1)) about the completion of a write request. Additional details of the encryption module are described below in reference to FIGS. 3.1 and 3.2.

One of ordinary skill will appreciate that the encryption module (230) may perform other functionalities without departing from the scope of the invention. When providing its functionalities, the encryption module (230) may perform all, or a portion, of the methods illustrated in FIGS. 3.1 and 3.2. The encryption module (230) may be implemented using hardware, software, or any combination thereof.

In one or more embodiments, the decryption module (240) may include functionality to, e.g.: (i) perform a convergent decryption mechanism, (ii) perform "decryption at rest" with keys (e.g., per-chunk keys stored in one or more metadata folders) to decrypt data (or data chunks), (iii) perform a data decryption operation in conjunction with the drives (270) (in which the decryption module (240) first retrieves an encrypted compressed data chunk from the corresponding volume and then decrypts that data to obtain a decrypted compressed data chunk), (iv) provide a decrypted compressed data chunk to the decompression module (260) (so that the decompression module (260) decompresses the decrypted compressed data chunk to obtain the actual data chunk), (v) receive (or obtain) a read request for an encrypted compressed data from a client of the clients (e.g., 110, FIG. 1) or from a server of the servers (e.g., 126, FIG. 1), (vi) analyze a read request to identify an encrypted metadata folder associated with a volume (e.g., a logical volume), (vii) obtain the corresponding per-volume key (e.g., the corresponding per-logical-volume key) from the key management server (e.g., 122, FIG. 1), (viii) decrypt an encrypted metadata folder using a per-volume key to obtain one or more per-chunk keys of respective encrypted compressed data chunks, (ix) upon decryption performed in (viii), analyze the metadata folder to identify a metadata file associated with an encrypted compressed data chunk of data (for example, requested in (v)), (x) extract a per-chunk key associated with an encrypted compressed data chunk from a metadata file, (xi) based on the hash value lookup table, identify storage location information of an encrypted compressed data chunk, (xii) based on storage location information, obtain an encrypted compressed data chunk from the corresponding drive/volume (e.g., 270A, 270B, etc.), (xiii) decrypt an encrypted compressed data chunk using a respective per-chunk key, and (xiv) manage (in conjunction with the decompression module (260)) all reading of data items from the corresponding drive/volume (e.g., 270A, 270B, etc.). Additional details of the decryption module are described below in reference to FIG. 3.3.

One of ordinary skill will appreciate that the decryption module (240) may perform other functionalities without departing from the scope of the invention. When providing its functionalities, the decryption module (240) may perform all, or a portion, of the methods illustrated in FIG. 3.3. The decryption module (240) may be implemented using hardware, software, or any combination thereof.

In one or more embodiments, the compression module (250) may include functionality to, e.g.: (i) by employing a set of linear, non-linear, and/or ML-based data compression models, compress a unique data chunk to obtain a compressed data chunk (in which the compression models minimize the number of bytes required to represent data and the amount of storage space required to store the data), (ii) provide a compressed data chunk to the encryption module (230), and manage (in conjunction with the deduplication module (220) and the encryption module (230)) all writing of data items in the corresponding drive/volume (e.g., 270A, 270B, etc.). Additional details of the compression module are described below in reference to FIG. 3.1.

One of ordinary skill will appreciate that the compression module (250) may perform other functionalities without departing from the scope of the invention. When providing its functionalities, the compression module (250) may perform all, or a portion, of the methods illustrated in FIG. 3.1. The compression module (250) may be implemented using hardware, software, or any combination thereof.

In one or more embodiments, the decompression module (260) may include functionality to, e.g.: (i) receive (or obtain) a decrypted compressed data chunk from the decryption module (240), (ii) by employing a set of linear, non-linear, and/or ML-based data decompression models, decompress a decrypted compressed data chunk to obtain a decrypted decompressed data chunk, (iii) initiate transmission of a decrypted decompressed data chunk to a client of the clients (e.g., 110, FIG. 1) or to a server of the servers (e.g., 126, FIG. 1) over the network (e.g., 130, FIG. 1), (iv) based on (iii), notify an administrator (of the storage array (200)) about the transmission using a GUI, and (v) manage (in conjunction with the decryption module (240)) all reading of data items from the corresponding drive/volume (e.g., 270A, 270B, etc.). Additional details of the decryption module are described below in reference to FIG. 3.3.

One of ordinary skill will appreciate that the decompression module (260) may perform other functionalities without departing from the scope of the invention. When providing its functionalities, the decompression module (260) may perform all, or a portion, of the methods illustrated in FIG. 3.3. The decompression module (260) may be implemented using hardware, software, or any combination thereof.

In one or more embodiments, the drives (270) may represent a collection (or a combination) of fully managed storage or memory resources/drives/volumes (e.g., 270A, 270B, etc.), in which each of the drives is functional to store unstructured and/or structured data. Each drive (e.g., 270A, 270B, etc.) may provide temporary and/or permanent data storage services (e.g., storing data, providing copies of previously stored data, restoring data using backups, etc.). Each drive may include hardware components and/or logical components. For example, Drive A (270A) may include any quantity and/or combination of memory components (i.e., volatile storage), long-term storage components (i.e., persistent storage), other types of hardware components that may provide short-term and/or long-term data storage services, and/or logical storage components (e.g., virtual persistent storage/virtual volatile storage).

In one or more embodiments, each drive (e.g., 270A, 270B, etc.) may store/log/record (temporarily or permanently) unstructured and/or structured data that may include (or specify), for example (but not limited to): an index of an asset (e.g., a file, a folder, etc.), an encrypted compressed data chunk (of multiple clients), an encrypted metadata folder, a backup history documentation of a workload, a restore history documentation of a workload, a documentation that indicates a set of jobs (e.g., a data backup job, a data restore job, etc.) that has been generated, a documentation that indicates a status of a job (e.g., how many jobs are still active, how many jobs are completed, etc.), a set of SLAs (e.g., an agreement that indicates a period of time required to retain backup data), recently obtained user information (e.g., records, credentials, etc.), a cumulative history of initiated data backup operations (e.g., sessions) over a prolonged period of time, a cumulative history of initiated data restoration operations over a prolonged period of time, one or more policies/rules for the operation (or configuration) of any component of the processing unit (210) (to manage functions/operations performed by the components of the processing unit (210)), a data protection policy (e.g., an SLA, an affinity-based backup policy, a data protection policy that dictates 30 days retention at storage, etc.) implemented by a user of a client of the clients (e.g., 110, FIG. 1), a configuration setting of that policy, one or more details of an initiated data transfer operation from a client of the clients (e.g., 110, FIG. 1) to the storage array (200), an identification of a resource provided by a drive, an amount of space used in a drive, an attribute of an asset, an access control list (ACL) of an asset, application data, user data, a snapshot of a volume, a list of instructions, a setting of an application, a version of an application, a version of an OS, display resolution configuration of a client, a product identifier of an application, a serial number of a client, a hardware identification (ID) number of a hardware component, an identifier of a client's manufacturer, media access control (MAC) information of a client, network connectivity information (e.g., a category of a network) of a client, an identifier of a client, a type of a client, a storage pool identifier, a parent storage pool identifier, a size of a storage pool, an amount of space used in a storage pool, an amount of space available in a storage pool, information associated with the types of provisioning functionality availability, etc.

While a drive (e.g., 270A, 270B, etc.) has been illustrated and described as including a limited quantity and type of data, the drive (e.g., 270A, 270B, etc.) in accordance with embodiments of the invention may store additional, less, and/or different data without departing from the scope of the invention.

In one or more embodiments, the unstructured and/or structured data may be maintained and/or updated (automatically) by third party systems (e.g., platforms, marketplaces, etc.) (provided by vendors) or by administrators based on, for example, newer (e.g., updated) versions of SLAs being available. The unstructured and/or structured data may also be updated when, for example (but not limited to): a data backup operation is initiated, a set of jobs is received, a data restore operation is initiated, an ongoing data backup operation is fully completed, etc.

In one or more embodiments, a drive (e.g., 270A, 270B, etc.) may provide an indexing service. For example, an agent of a drive (e.g., 270A, 270B, etc.) may receive various data protection related inputs directly from the components of the processing unit (210) (or indirectly from the clients (e.g., 110, FIG. 1)). Upon receiving, the agent may analyze those inputs to generate an index(es) (e.g., a data backup operation index(es)) for optimizing the performance of the drive (e.g., 270A, 270B, etc.) by reducing a required amount of access (es) when implementing a request (e.g., a data retrieval request). In this manner, requested data may be quickly located and accessed from the drive (e.g., 270A, 270B, etc.) using an index of the requested data. In one or more embodiments, an index may refer to a data structure that is defined by one or more field expressions. A field expression may be a single field name such as "user_number". For example, an index (e.g., E41295) may be associated with "user_name" (e.g., Adam Smith) and "user_number" (e.g., 012345), in which the requested data is "Adam Smith 012345".

Further, in one or more embodiments, an index may include, for example (but not limited to): information about a user associated with a data protection operation (e.g., a data backup operation, a data recovery operation, etc.), a keyword extracted from a data recovery operation that relates to a type of the recovery (e.g., cloud disaster recovery, rapid recovery, etc.), a tag associated with a data protection operation (e.g., a permanent and self-service data backup from a VM), etc. The index(es) may also include other information that may be used to efficiently identify historical data protection operations. In one or more embodiments, the aforementioned data may be stored as "data protection operation metadata" in the drive (e.g., 270A, 270B, etc.).

One of ordinary skill will appreciate that the drives (270) may perform other functionalities without departing from the scope of the invention. When providing its functionalities, the drives (270) may perform all, or a portion, of the methods illustrated in FIGS. 3.1-3.3. The drives (270) may be implemented using hardware, software, or any combination thereof.

In one or more embodiments, the storage array (200) may additionally or alternatively include other types of components, such as a lockbox (not shown). Similar to the key management server (e.g., 122, FIG. 1), a lockbox is a secure platform module that encompasses functionalities of the key management server (e.g., 122, FIG. 1). Referring to FIG. 1, the key management server (e.g., 122, FIG. 1) is external to the storage array (200), whereas the lockbox is internal to the storage array (200). Details (or functionalities) of the key management server are described above in reference to FIG. 1.

One of ordinary skill will appreciate that the lockbox may perform other functionalities without departing from the scope of the invention. When providing its functionalities, the lockbox may perform all, or a portion, of the methods illustrated in FIGS. 3.1-3.3. The lockbox may be implemented using hardware, software, or any combination thereof.

In one or more embodiments, the deduplication module (220), the encryption module (230), the decryption module (240), the compression module (250), the decompression module (260), and the drives (270) may be utilized in isolation and/or in combination to provide the above-discussed functionalities. These functionalities may be invoked using any communication model including, for example, message passing, state sharing, memory sharing, etc. By doing so, the storage array (200) may address issues related to data security, integrity, and availability proactively.

Further, some of the above-discussed functionalities may be performed using available resources or when resources of the storage array (200) are not otherwise being consumed. By performing these functionalities when resources are available, these functionalities may not be burdensome on the resources of the storage array (200) and may not interfere with more primary workloads performed by the storage array (200).

FIGS. 3.1-3.3 show a method for supporting dedupe, compression, logical volume crypto-erasure, and physical volume crypto-erasure on a storage array in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3.1, the method shown in FIG. 3.1 may be executed by, for example, the above-discussed storage array (e.g., 200, FIG. 2). Other components of the system (100) illustrated in FIG. 1 may also execute all or part of the method shown in FIG. 3.1 without departing from the scope of the invention.

In Step 300, the storage array (or more specifically, e.g., the deduplication module (e.g., 220, FIG. 2)) receives data (e.g., plaintext, a storage object, etc.) and a write request for the data from a requesting entity (e.g., a user of a client of the clients (e.g., 110, FIG. 1), an administrator terminal, etc.). In one or more embodiments, upon the user of the client generating a newer or changed data, the user may send the changed data (via the client) to the storage array over a network (e.g., 130, FIG. 1) for storage (in, for example, one of the drives/volumes (e.g., 270A, 270B, etc., FIG. 2)). It may be possible that the data is actually transmitted by the client in an encrypted form but then decrypted (by employing a set of linear, non-linear, and/or ML-based data decryption models) to recover the corresponding data before performing further steps.

In Step 302, the storage array (or more specifically, e.g., the deduplication module) divides (or breaks) the data (received in Step 300) into one or more data chunks (e.g., data blocks that may be of variable length). In order to divide the data, the deduplication module may employ a set of linear, non-linear, and/or ML data partition models. In one or more embodiments, the deduplication module may then assign each data chunk a "handle" (e.g., an address in virtual address space of a corresponding volume, or other unique identifier (e.g., a combination of numbers, letters, and/or symbols)) such that a unique pair [volume, handle] for each data chunk may be generated.

In Step 304, the storage array (or more specifically, e.g., the deduplication module) sets a current data chunk as a first data chunk (e.g., setting the current data chunk to be the first data chunk).

In Step 306, the storage array (or more specifically, e.g., the deduplication module) generates a hash value (e.g., a cryptographic fingerprint, a fixed sized value, a hash result, etc.) for the current data chunk (see FIG. 4) by employing a hash function (e.g., the SHA-256 model, the MD5 model, etc.). However, one of ordinary skill in the art would understand that the deduplication module may generate the hash value by other methods, such as obtaining the hash value from another computing device of the storage array.

In one or more embodiments, the deduplication module may divide (e.g., partition) the hash value (in which the hash value has enough bits to serve the following functions) into two (or more) parts (e.g., portions), in which, for example, a first portion of the hash value may be used as a "duplicate data detection hint" (or as a "deduplication identifier") to generate a deduplication key and a second portion of the hash value may be used to generate a per-chunk key (e.g., a per-chunk encryption key, a unique data encryption key, etc.) by employing a set of linear, non-linear, and/or ML-based key generation models. In order to partition the hash value, the deduplication module may employ a set of linear, non-linear, and/or ML data partition models, and as indicated, the partitioning of the hash value provides a more efficient use of the hash value.

In one or more embodiments, the partitioning of the hash value may be based on pre-configured partitioning policies such that the deduplication module may have a limit on the total number of partitions that may be allowed. For example, in order to effectively use the bits of the hash value (for the generation of a strong (e.g., not easily guessed) per-chunk key), the deduplication module may be configured to create only two parts: one part for generating a deduplication key (and/or for performing data deduplication operations) and one part for generating a per-chunk key.

In Step 308, the storage array (or more specifically, e.g., the deduplication module) looks up for the deduplication key (generated in Step 306) in a deduplication index of the hash value lookup table (described above in reference to FIG. 1).

In Step 310, based on the hash value lookup table (more specifically, based on the hash values and/or deduplication keys listed in the deduplication directory/index of the table), the storage array (or more specifically, e.g., the deduplication module) makes a determination as to whether any duplicate deduplication key is found (or as to whether the current data chunk is unique (e.g., not a duplicate)). Accordingly, in one or more embodiments, if the result of the determination is YES, the method proceeds to Step 312

(indicating that the current data chunk has been previously stored in the corresponding volume (e.g., a duplicate/existing data chunk), so the current data chunk need not be written to the corresponding volume; rather, for example, a pointer to the existing data chunk should be referenced and a pointer count indicating the number of data chunks pointing to the existing data chunk should be incremented). If the result of the determination is NO, the method alternatively proceeds to Step 314 (indicating that the current data chunk has not been previously stored in the corresponding volume, so the current data chunk need to be written to the corresponding volume). In this manner, the deduplication module ensures that only a single copy of a given data chunk is stored in the corresponding volume, even though multiple clients have requested storage of the same data chunk within the drives.

In Step 312, as a result of the determination in Step 310 being YES (in which the necessity for the expenditure of unneeded processing resources is prevented), the storage array (or more specifically, e.g., the deduplication module) retrieves storage location information of the duplicate/existing data chunk from the deduplication index of the hash value lookup table. In one or more embodiments, to note that the data (received in Step 300) includes one or more existing data chunks, the deduplication module may update (e.g., configure) the hash value lookup table by incrementing a pointer counter (and may mark the existing data chunks for garbage collection). The pointer counter may count the number of tenants (e.g., clients) that are associated with (or have access to) a given stored data item (e.g., an encrypted compressed data chunk), in which each of those clients pointing to the same copy of the data item stored in the corresponding volume.

Similarly, the pointer counter may also count the number of volumes that are associated with (or have access to) a given stored data item, in which each of those volumes pointing to the same copy of the data item stored in the corresponding volume (for example, a single data chunk may be referenced by one or more volumes).

For example, if Client B of the clients is the second client to be associated with Data Chunk X, the deduplication module may increment the pointer counter from its initial value of 1 (established when Data Chunk X was first received from Client A of the clients) to a value of 2 (so that the storage array will not attempt to store the same data chunk with identical plaintext). In one or more embodiments, at least one of the pointers, the pointer counter, and access or modification timestamps may be maintained in the deduplication index of the hash value lookup table.

In Step 314, as a result of the determination in Step 310 being NO, the storage array (or more specifically, e.g., the deduplication module) may populate the hash value lookup table to store (temporarily or permanently) the deduplication key (of the unique data chunk) (so that the deduplication module may easily detect a received duplicate data chunk at a later point-in-time), and may send the unique data chunk to the compression module (e.g., 250, FIG. 2) and the second portion of the hash value (i.e., the per-chunk key) to the encryption module (e.g., 230, FIG. 2).

Thereafter, by employing a set of linear, non-linear, and/or ML-based data compression (e.g., data size reduction) models (e.g., lossless compression models, lossy compression models, etc.), the storage array (or more specifically, e.g., the compression module) compresses the unique data chunk to obtain a compressed data chunk. The compression module may then send the compressed data chunk to the encryption module. Those skilled in the art will appreciate that compression of the unique data chunk may provide storage space efficiency for the storage.

In Step 316, by employing a set of linear, non-linear, and/or ML-based data encryption models (or different cryptographic modes) (e.g., the XTS mode, the GCM, etc.) and using the per-chunk key (obtained in Step 314), the storage array (or more specifically, e.g., the encryption module) encrypts the compressed data chunk to generate an encrypted compressed data chunk (so that the information included in the compressed data chunk is encrypted before storing it in Step 320 of FIG. 3.2).

In Step 318, the storage array (or more specifically, e.g., the encryption module) finds a storage location on the logical volume of, for example, physical media or the drives to store the encrypted compressed data chunk.

Turning now to FIG. 3.2, the method shown in FIG. 3.2 may be executed by, for example, the above-discussed storage array. Other components of the system (100) illustrated in FIG. 1 may also execute all or part of the method shown in FIG. 3.2 without departing from the scope of the invention.

In Step 320, the storage array (or more specifically, e.g., the encryption module) stores the encrypted compressed data chunk (generated in Step 316 of FIG. 3.1) in the logical volume, in which the encrypted compressed data chunk is associated with a respective metadata folder (that includes the corresponding per-chunk key) encrypted using a respective per-logical-volume key (see Step 330). In one or more embodiments, because of a user level (e.g., 9/10) of the user that wanted to store the data (received in Step 300 of FIG. 3.1) in the storage array, the encrypted compressed data chunk (which has a certain security level) may only be stored in a particular volume (e.g., the logical volume).

Further, upon storing the encrypted compressed data chunk in the logical volume, a "shared secret value" (associated with the encrypted compressed data chunk) may be used (jointly by the clients and the storage array) in order to limit the ability of guessing plaintext chunks based on ciphertext access of the clients. For example, without a shared secret value, a client may be used (by a malicious actor) to guess a data chunk (e.g., plaintext), perform a hash value generation operation on that data chunk to generate a per-chunk key, and compress and encrypt the guessed data chunk using that per-chunk key to generate a guessed encrypted compressed data chunk (e.g., guessed ciphertext), in which the guessed ciphertext may then be used to search the drives for a match. For at least the above-mentioned reasons, providing a shared secret value to the clients may limit the ability to perform such "plaintext" guessing attacks to the clients.

In Step 322, the storage array (or more specifically, e.g., the encryption module) obtains storage location information of the encrypted compressed data chunk from the logical volume.

In Step 324, in response to obtaining the information, the storage array (or more specifically, e.g., the encryption module) adds the deduplication key and storage location information to the deduplication index of the hash value lookup table. Said another way, the encryption module updates the hash value lookup table for later use (e.g., when a data read request is received at a later point-in-time).

In one or more embodiments, when an encrypted compressed data chunk is received by the logical volume that is not currently stored in the logical volume, the logical volume may operate to store that received encrypted compressed data chunk at a storage location in the logical volume, and associate that storage location and a deduplication identifier for that received encrypted compressed data chunk in the hash value lookup table.

In Step 326, the storage array (or more specifically, e.g., the encryption module) stores (e.g., records) (temporarily or permanently) the per-chunk key (generated in Step 306 of FIG. 3.1) and storage location information (obtained in Step 312 or Step 322) in a metadata file associated with the unique data chunk.

In Step 328, the storage array (or more specifically, e.g., the encryption module) obtains (or retrieves) a per-logical-volume key for a particular logical volume (in which the user of the client requested to store the data (received in Step 300 of FIG. 3.1) in that logical volume) from (a) the key management server (e.g., 122, FIG. 1) (externally) or (b) the lockbox (internally).

In one or more embodiments, the key management server (or the lockbox) may aid in the encryption of metadata folders associated with volumes and/or decryption of encrypted metadata folders associated with volumes (see FIG. 3.3) as initiated by the storage array. For example, the key management server may aid in the encryption of a metadata folder by generating a per-logical-volume key. As yet another example, the key management server may aid in the decryption of a metadata folder by providing a previously generated per-logical-volume key (e.g., a per-logical-volume key that was generated to encrypt the metadata folder at a previous point-in-time).

In one or more embodiments, as a security measure in an attempt to reduce undesired exposure, the key management server (or the lockbox) may generate (and send) a time-based per-logical-volume key in order to set an expiration date/time for the corresponding per-logical-volume key. For example, upon receipt by the encryption module, a per-logical-volume key may be expired within a predetermined period of time (e.g., ten minutes).

In one or more embodiments, a per-logical-volume key may be a symmetric per-logical-volume key (in which the decryption module (e.g., 240, FIG. 2) may use the same cryptographic key (which will be used to encrypt the metadata folder in Step 330) to decrypt the metadata folder in Step 346 of FIG. 3.3. In one or more embodiments, asymmetric per-logical-volume keys (e.g., a pair of related keys—one public key and one private key) may be utilized by the storage array. For example, the encryption module may use Key E to encrypt the metadata folder in Step 330. Thereafter, the decryption module may use Key E* (which is related to Key E (based on the "Key E-Key E*" pair)) to decrypt the metadata folder in Step 346 of FIG. 3.3.

Those skilled in the art will appreciate that a variety of other types of per-logical-volume keys may be used without departing from the scope of the invention.

In Step 330, upon receiving the per-logical-volume key (in Step 328), the storage array (or more specifically, e.g., the encryption module) encrypts a metadata folder (associated with the logical volume) (a) using the per-logical-volume key and (b) by employing a set of linear, non-linear, and/or ML-based data encryption models (e.g., an encryption model based on the XTS mode (Tweak=Address)), in which the metadata folder contains at least the metadata file of the unique data chunk. In this manner, (i) two data chunks may be encrypted with the same per-chunk key and the per-chunk key may be present in two metadata files (which may be encrypted with different keys), and (ii) per-chunk keys are not individually encrypted but rather each per-chunk key is stored in a metadata file of the corresponding data chunk, in which (a) those metadata files are stored in the corresponding "per-volume metadata folder" and (b) the per-volume metadata folder is encrypted with a per-logical-volume key before being written in the corresponding volume.

Additionally, security of per-chunk keys is improved within the storage array as the per-chunk keys are not exposed in unencrypted form to any components of the storage array. This avoids situations in which per-chunk keys could be improperly disclosed through a compromised OS inopportune memory dump or other issues relating to volume software.

In Step 332, the storage array (or more specifically, e.g., the encryption module) stores the encrypted metadata folder in the logical volume.

In one or more embodiments, some of the steps of FIGS. 3.1 and 3.2 may be repeated for each of one or more additional data chunks in order to at least compress, encrypt, and store multiple unique data chunks. To this end, in Step 334, the storage array (or more specifically, e.g., the encryption module) makes a determination as to whether any additional data chunks that needs to be examined/considered. Accordingly, in one or more embodiments, if the result of the determination is YES, the method proceeds to Step 336. If the result of the determination is NO, the method alternatively proceeds to Step 338.

In Step 336, as a result of the determination in Step 334 being YES, the encryption module instructs the deduplication module to proceed to a next data chunk. To this end, the method returns to Step 306 of FIG. 3.1.

In Step 338, as a result of the determination in Step 334 being NO, the encryption module initiates notification of the user of the client (that triggered the write request received in Step 300 of FIG. 3.1) about the completion of the operation (e.g., the write request). The notification may include, for example (but not limited to): the number of encrypted compressed data chunks that has been stored, the number of hash values that has been recorded in the hash value lookup table, etc.

In one or more embodiments, the notification may indicate whether the operation was completed within the predetermined window, or whether the operation was completed after exceeding the predetermined window. The notification may be displayed on the GUI of the client.

In one or more embodiments, the method may end following Step 338.

Turning now to FIG. 3.3, the method shown in FIG. 3.3 may be executed by, for example, the above-discussed storage array. Other components of the system (100) illustrated in FIG. 1 may also execute all or part of the method shown in FIG. 3.3 without departing from the scope of the invention.

In Step 340, at a later point-in-time (e.g., after the notification is received in Step 338 of FIG. 3.2), the storage array (or more specifically, e.g., the decryption module (e.g., 240, FIG. 2)) receives a read request (e.g., a data retrieval request) for a data chunk of encrypted compressed data. In one or more embodiments, the read request may be received from an entity (e.g., a user, another type of entity, etc.) attempting to access the data stored in a volume (e.g., a logical volume, a physical volume, etc.).

In Step 342, in response to the read request (received in Step 340), the storage array (or more specifically, e.g., the decryption module) analyzes the request to identify an encrypted metadata folder associated with the volume (e.g., the logical volume).

In Step 344, based on the analysis performed in Step 342, the storage array (or more specifically, e.g., the decryption module) obtains (or requests) the corresponding per-logical-volume key from, for example, the key management server. In one or more embodiments, after obtaining the per-logical-volume key, the key may be kept in the storage array for a subsequent data read process while the corresponding volume is still active (for efficiency purposes).

In Step 346, (a) using the per-logical-volume key and (b) by employing a set of linear, non-linear, and/or ML-based data decryption models (e.g., a decryption model based on the XTS mode (Tweak=Address)), the storage array (or more specifically, e.g., the decryption module) decrypts the encrypted metadata folder.

In Step 348, upon decryption (performed in Step 346), the storage array (or more specifically, e.g., the decryption module) analyzes the metadata folder to identify a metadata file associated with a data chunk of the encrypted compressed data (requested in Step 340).

In Step 350, the storage array (or more specifically, e.g., the decryption module) extracts a per-chunk key associated with the data chunk (i.e., the encrypted compressed data chunk) from the metadata file (said another way, the decryption module identifies the respective per-chunk key used to generate the encrypted compressed data chunk, for example, in Step 316 of FIG. 3.2).

In Step 352, based on the hash value lookup table (which associates deduplication identifiers and storage locations for each encrypted compressed data chunks in the drives), the storage array (or more specifically, e.g., the decryption module) identifies storage location information of the encrypted compressed data chunk. In one or more embodiments, based on the hash value lookup table, the decryption module may also identify a deduplication identifier associated with the encrypted compressed data chunk.

In Step 354, based on the storage location information (identified in Step 352), the storage array (or more specifically, e.g., the decryption module) obtains (or retrieves) the encrypted compressed data chunk from the logical volume.

In Step 356, (a) using the per-chunk key (extracted in Step 350) and (b) by employing a set of linear, non-linear, and/or ML-based data decryption models (e.g., a decryption model based on the XTS mode (Tweak=0)), the storage array (or more specifically, e.g., the decryption module) decrypts the encrypted compressed data chunk. By decrypting the encrypted compressed data chunk, the decryption module obtains a decrypted compressed data chunk. Thereafter, the decryption module sends the decrypted compressed data chunk to the decompression module (e.g., 260, FIG. 2).

In Step 358. (a) upon receiving the decrypted compressed data chunk and (b) by employing a set of linear, non-linear, and/or ML-based data decompression models, the storage array (or more specifically, e.g., the decompression module) decompresses the decrypted compressed data chunk to obtain a decrypted decompressed data chunk (e.g., a plaintext data chunk).

In Step 360, upon obtaining the decrypted decompressed data chunk (in Step 358), the storage array (or more specifically, e.g., the decompression module) transmits the decrypted decompressed data chunk to the client over the network. In one or more embodiments, if a retransmission of the decrypted decompressed data chunk is required (when, for example, a receipt acknowledgement has not been received by the decompression module for the data chunk after a predetermined period of time), the decompression module may retransmit the data chunk. To this end, the decompression module may monitor acknowledgement(s) generated by the client so that the decompression module may determine whether the data chunk has been successfully delivered (so that, for example, the storage array's resources may become free to perform a subsequent process) or needs to be retransmitted.

Further, upon transmission, the decompression module may log the details (e.g., the number data chunks that has been transmitted, total size of data that has been transmitted, one or more details regarding the network, etc.) of the transmission in a drive.

In Step 362, in response to the transmission (in Step 360), the decompression module initiates notification of the user of the client (that triggered the read request received in Step 340) about the completion of the operation (e.g., the read request). The notification may include, for example (but not limited to): the number of data chunks that have been transmitted, total size of data that has been transmitted, etc.

In one or more embodiments, the notification may indicate whether the operation was completed within the predetermined window, or whether the operation was completed after exceeding the predetermined window. The notification may be displayed on the GUI of the client.

In one or more embodiments, Steps 348-362 may be repeated for each of one or more additional data chunks in order to at least decompress, decrypt, and transmit multiple data chunks.

In one or more embodiments, the method may end following Step 362.

Figure 4:
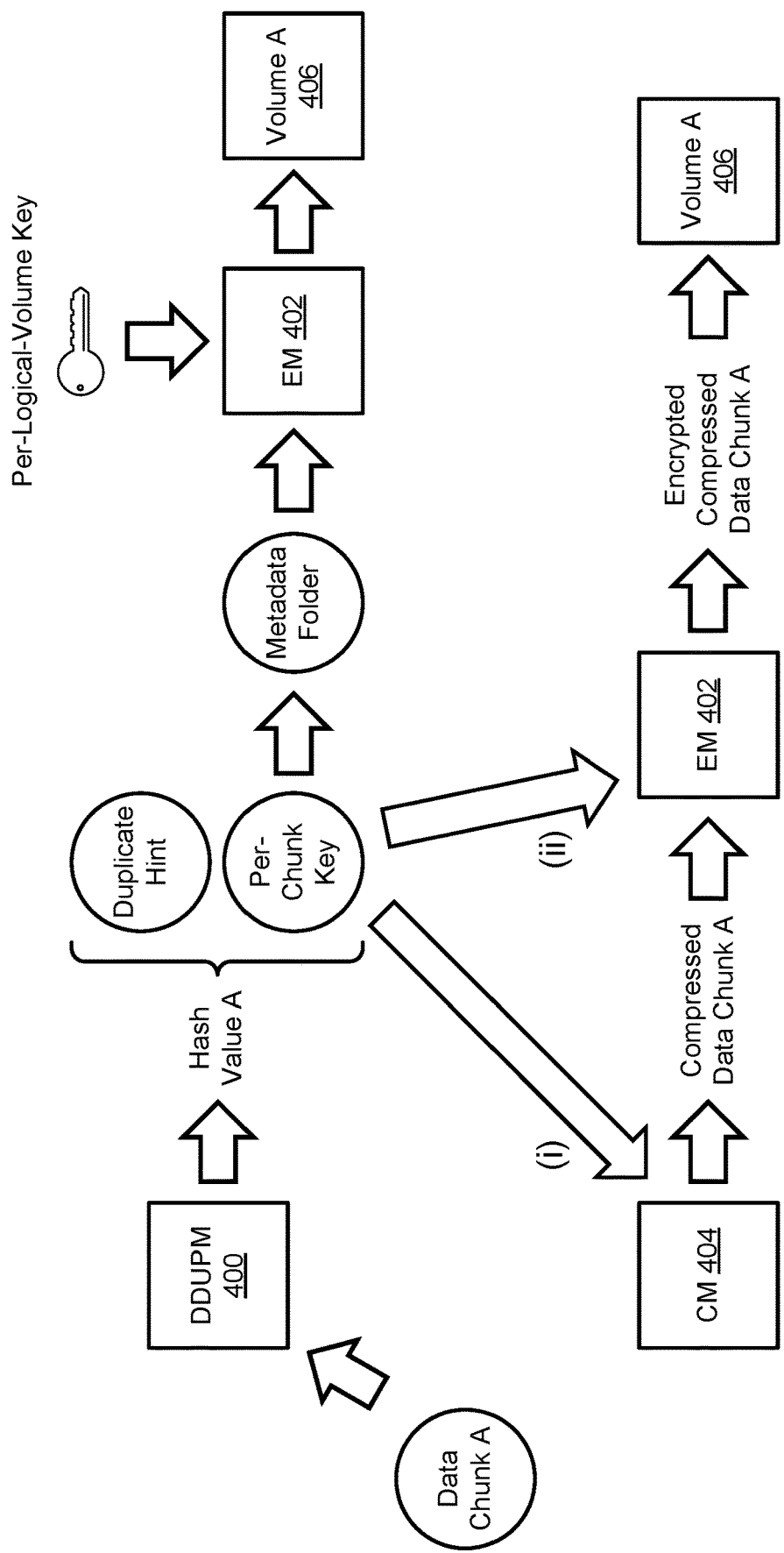
FIG. 4 shows an example convergent encryption use case in accordance with one or more embodiments of the invention.

To further clarify embodiments of the invention, a non-limiting example convergent encryption use case is provided in FIG. 4. FIG. 4 shows a diagram of an example of storage array components similar to that of FIG. 2.

Start of Example

The example convergent encryption use case, illustrated in FIG. 4, is not intended to limit the scope of the embodiments disclosed herein and is independent from any other examples discussed in this application.

Turning to the example, FIG. 4 shows a diagram of components of a storage array (not shown). For the sake of brevity, not all components of the storage array may be illustrated in FIG. 4.

Assume here that FIG. 4 illustrates an embodiment where the deduplication module (DDUPM) (400) receives data and a write request for the data from a user of a client (not shown). The DDUPM (400) then divides the data into one or more data chunks (e.g., Data Chunk A) by employing a data partition model. The DDUPM (400) generates a hash value (e.g., Hash Value A) for Data Chunk A by employing a hash function, in which the DDUPM (400) partitions Hash Value A into two portions: (a) a first portion to be used as a "duplicate data detection hint" to generate a deduplication key and (b) a second portion to be used to generate a per-chunk key by employing a key generation model.

Thereafter, based on a hash value lookup table (more specifically, based on the hash values listed in the deduplication directory of the table) and the duplicate data detection hint, the DDUPM (400) makes a determination that Data Chunk A is unique.

Based on the determination, the DDUPM (400) populates the hash value lookup table to store (temporarily or permanently) the deduplication key (so that the DDUPM (400) easily detects a received duplicate data chunk at a later point-in-time), and sends Data Chunk A (indicated by "(i)") to the compression module (CM) (404) and the per-chunk key (indicated by "(ii)") to the encryption module (EM) (402).

Thereafter, the CM (404) compresses Data Chunk A (received from the DDUPM (400)) to obtain compressed Data Chunk A by employing a data compression model and sends compressed Data Chunk A to the EM (402). Upon receiving compressed Data Chunk A, the EM (402) encrypts compressed Data Chunk A by employing an encryption model and using the per-chunk key. In this manner, the EM (402) generates encrypted compressed Data Chunk A. The EM (402) then stores encrypted compressed Data Chunk A in Volume A (406) (so that Data Chunk A will be protected against unauthorized access and will not be exposed to a malicious actor) and obtains storage location information of encrypted compressed Data Chunk A from Volume A (406).

Further, the EM (402) adds the deduplication key and storage location information to the deduplication index of the hash value lookup table. The EM (402) then stores (temporarily or permanently) the per-chunk key and storage location information in a metadata file associated with Data Chunk A, and obtains a per-logical-volume key for a particular logical volume (e.g., Volume A (406)) (in which the user of the client requested to store the data in that logical volume) from a key management server (not shown). Upon receiving the per-logical-volume key, the EM (402) encrypts a metadata folder (associated with Volume A (406)) (a) using the per-logical-volume key and (b) by employing a data encryption model, in which the metadata folder contains at least the metadata file of Data Chunk A. The EM (402) then stores the encrypted metadata folder in Volume A (406) and initiates notification of the user of the client (that triggered the write request) about the completion of the operation (e.g., the write request).

End of Example

Figure 5:
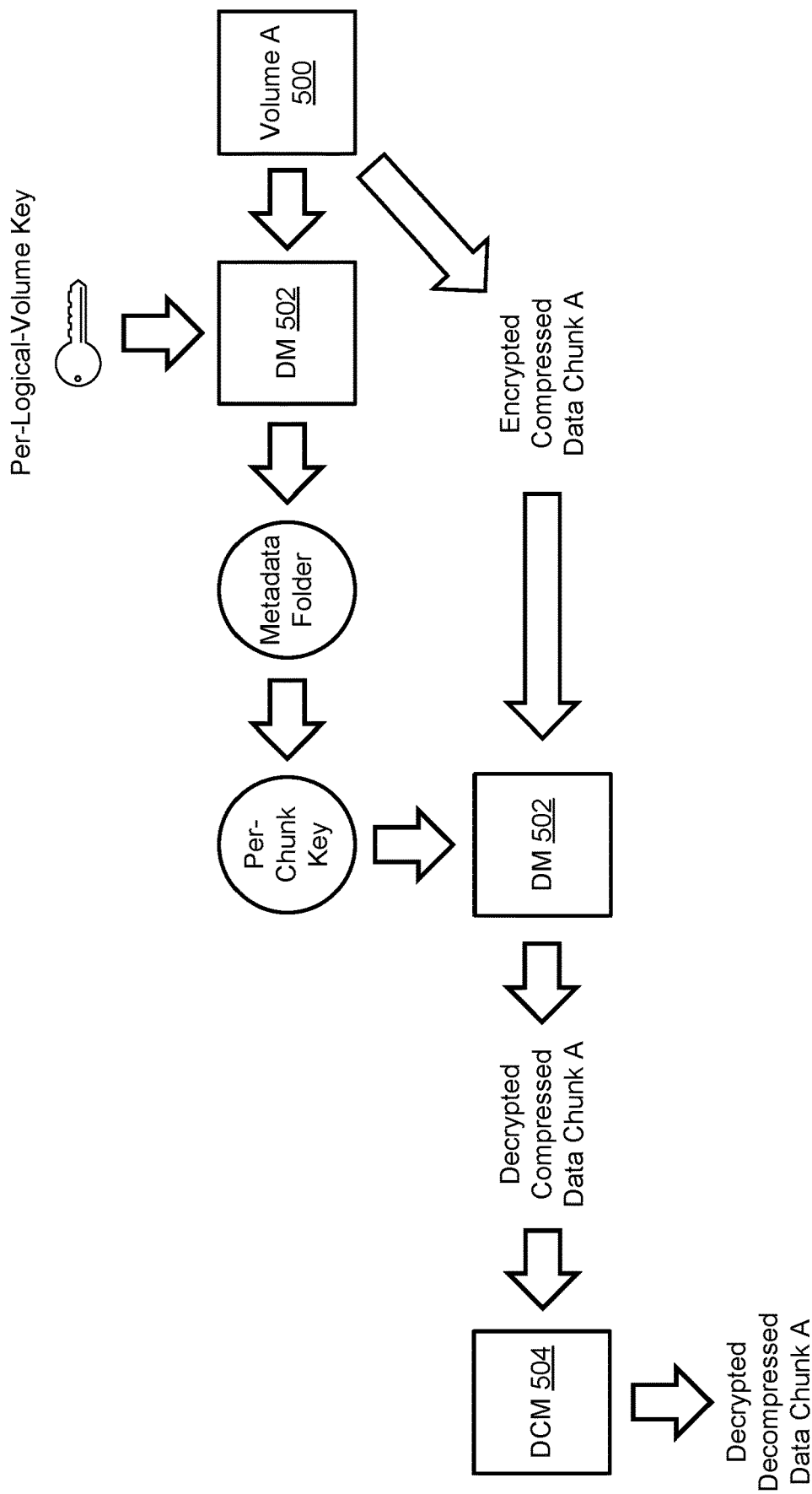
FIG. 5 shows an example convergent decryption use case in accordance with one or more embodiments of the invention.

To further clarify embodiments of the invention, a non-limiting example convergent decryption use case is provided in FIG. 5. FIG. 5 shows a diagram of an example of storage array components similar to that of FIG. 2.

Start of Example

The example convergent decryption use case, illustrated in FIG. 5, is not intended to limit the scope of the embodiments disclosed herein and is independent from any other examples discussed in this application.

Turning to the example, FIG. 5 shows a diagram of components of a storage array (not shown). For the sake of brevity, not all components of the storage array may be illustrated in FIG. 5.

Assume here that FIG. 5 illustrates an embodiment where the decryption module (DM) (502) receives a read request for a data chunk (e.g., Data Chunk A) of encrypted compressed data from the user of the client at a later point-in-time (for example, referring to FIG. 4, after the notification is received). In response to the read request, the DM (502) analyzes the request to identify an encrypted metadata folder associated with the corresponding volume (Volume A (500)). Based on the analysis, the DM (502) obtains the corresponding per-logical-volume key from the key management server, and (a) using the per-logical-volume key and (b) by employing a data decryption model, the DM (502) decrypts the encrypted metadata folder.

Thereafter, the DM (502) analyzes the metadata folder to identify a metadata file associated with Data Chunk A (i.e., the encrypted compressed data chunk) and extracts a per-chunk key associated with Data Chunk A from the metadata file. Based on the hash value lookup table, the DM (502) identifies storage location information of Data Chunk A and using that information, obtains Data Chunk A from Volume A (500). The DM (502) then decrypts Data Chunk A to obtain decrypted compressed Data Chunk A (a) using the per-chunk key and (b) by employing a data decryption model, and sends decrypted compressed Data Chunk A to the decompression module (DCM) (504).

Upon receiving decrypted compressed Data Chunk A and by employing a data decompression model, the DCM (504) decompresses decrypted compressed Data Chunk A to obtain a decrypted decompressed Data Chunk A. Upon obtaining decrypted decompressed Data Chunk A, the DCM (504) transmits decrypted decompressed Data Chunk A to the client over a network (not shown). In response to the transmission, the DCM (504) initiates notification of the user of the client (that triggered the read request) about the completion of the operation (e.g., the read request).

End of Example

Turning now to FIG. 6, FIG. 6 shows a diagram of a computing device in accordance with one or more embodiments of the invention.

In one or more embodiments of the invention, the computing device (600) may include one or more computer processors (602), non-persistent storage (604) (e.g., volatile memory, such as RAM, cache memory), persistent storage (606) (e.g., a hard disk, an optical drive such as a CD drive or a DVD drive, a Flash memory, etc.), a communication interface (612) (e.g., Bluetooth interface, infrared interface, network interface, optical interface, etc.), an input device(s) (610), an output device(s) (608), and numerous other elements (not shown) and functionalities. Each of these components is described below.

In one or more embodiments, the computer processor(s) (602) may be an integrated circuit for processing instructions. For example, the computer processor(s) (602) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (e.g., a LAN, a WAN, Internet, mobile network, etc.) and/or to another device, such as another computing device.

In one or more embodiments, the computing device (600) may include one or more output devices (608), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for operating a storage array, the method comprising:
   generating a per-chunk key and a deduplication key for a data chunk based on a hash value, wherein the hash value is associated with the data chunk, wherein the per-chunk key is stored in a metadata file;
   obtaining a per-volume key for a volume of the storage array;
   encrypting a metadata folder associated with the volume to generate an encrypted metadata folder using the per-volume key, wherein the encrypted metadata folder comprises at least the metadata file;
   compressing the data chunk to generate a compressed data chunk (CDC);
   encrypting the CDC to generate an encrypted compressed data chunk (ECDC) using the per-chunk key, wherein the ECDC is stored in the volume;
   obtaining storage location information of the ECDC;
   updating a hash value lookup table based on the storage location information; and
   initiating notification of a user of a client about completion of a write request, wherein the write request comprises at least an identifier of the volume.

2. The method of claim 1, further comprising:
   receiving the write request for data from the client;
   dividing the data into a plurality of data chunks, wherein the plurality of data chunks comprises at least the data chunk; and
   making a determination whether the data chunk is unique based on the hash value, wherein the data chunk is determined to be unique.

3. The method of claim 2, further comprising:
   generating the hash value for the data chunk,
   wherein at least a portion of the hash value is used to make the determination,
   wherein the compression of the data chunk is performed in response to the determination.

4. The method of claim 3, wherein the hash value is generated using a secure hash algorithm (SHA)-256 model.

5. The method of claim 1, wherein the hash value comprises at least a first portion and a second portion, wherein the first portion is used to generate the deduplication key, wherein the second portion is used to generate the per-chunk key.

6. The method of claim 1, wherein the volume is a logical volume.

7. The method of claim 1, wherein the per-volume key is obtained from a key management server, wherein the key management server is external to the storage array.

8. The method of claim 7, wherein, when the storage array is discarded, the key management server deletes the per-volume key to crypto-erase at least the data chunk stored in the volume.

9. The method of claim 1, wherein the per-volume key is obtained from a lockbox, wherein the lockbox is internal to the storage array.

10. A non-transitory computer-readable medium comprising computer-readable program code, which when executed by a computer processor enables the computer processor to perform a method for operating a storage array, the method comprising:
    generating a per-chunk key and a deduplication key for a data chunk based on a hash value, wherein the hash value is associated with the data chunk, wherein the per-chunk key is stored in a metadata file;
    obtaining a per-volume key for a volume of the storage array;
    encrypting a metadata folder associated with the volume to generate an encrypted metadata folder using the per-volume key, wherein the encrypted metadata folder comprises at least the metadata file;
    compressing the data chunk to generate a compressed data chunk (CDC);
    encrypting the CDC to generate an encrypted compressed data chunk (ECDC) using the per-chunk key, wherein the ECDC is stored in the volume;
    obtaining storage location information of the ECDC;
    updating a hash value lookup table based on the storage location information; and
    initiating notification of a user of a client about completion of a write request, wherein the write request comprises at least an identifier of the volume.

11. The non-transitory computer-readable medium of claim 10, further comprising:
    receiving the write request for data from the client;
    dividing the data into a plurality of data chunks, wherein the plurality of data chunks comprises at least the data chunk; and
    making a determination whether the data chunk is unique based on the hash value, wherein the data chunk is determined to be unique.

12. The non-transitory computer-readable medium of claim 11, further comprising:
    generating the hash value for the data chunk,
    wherein at least a portion of the hash value is used to make the determination,
    wherein the compression of the data chunk is performed in response to the determination.

13. The non-transitory computer-readable medium of claim 10, wherein the hash value comprises at least a first portion and a second portion, wherein the first portion is used to generate the deduplication key, wherein the second portion is used to generate the per-chunk key.

* * * * *